(12) United States Patent
Nakajima

(10) Patent No.: US 12,515,479 B2
(45) Date of Patent: Jan. 6, 2026

(54) TIRE

(71) Applicant: Sumitomo Rubber Industries, Ltd., Kobe (JP)

(72) Inventor: Koichi Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 295 days.

(21) Appl. No.: 18/024,466

(22) PCT Filed: Sep. 1, 2021

(86) PCT No.: PCT/JP2021/032048
§ 371 (c)(1),
(2) Date: Mar. 2, 2023

(87) PCT Pub. No.: WO2022/050287
PCT Pub. Date: Mar. 10, 2022

(65) Prior Publication Data
US 2023/0322028 A1  Oct. 12, 2023

(30) Foreign Application Priority Data

Sep. 3, 2020  (JP) .................................. 2020-148450
Dec. 25, 2020  (JP) .................................. 2020-217478

(51) Int. Cl.
*B60C 11/12*  (2006.01)
(52) U.S. Cl.
CPC ...... *B60C 11/1236* (2013.01); *B60C 11/1218* (2013.01); *B60C 11/1263* (2013.01);
(Continued)

(58) Field of Classification Search
CPC ............ B60C 11/1236; B60C 11/1218; B60C 11/1263; B60C 2011/1254; B60C 2011/1213
See application file for complete search history.

(56) References Cited

U.S. PATENT DOCUMENTS 3,861,436 A * 1/1975 Poque ..................... B60C 11/12
152/209.1
4,429,728 A  2/1984 Ippen et al.
(Continued)

FOREIGN PATENT DOCUMENTS

EP  0 071 809 A2  2/1983
EP  2862729 A1 *  4/2015  ......... B60C 11/1236
(Continued)

OTHER PUBLICATIONS

Machine translation for JP 2004-306872 (Year: 2025).*
(Continued)

*Primary Examiner* — Steven D Maki
(74) *Attorney, Agent, or Firm* — Birch, Stewart, Kolasch & Birch, LLP

(57) ABSTRACT

A tire comprises a tread portion including a land portion. In the land portion, closed sipes are arranged in a tire axial direction. Each of the closed sipes includes a first end, a second end, a first sipe piece extending in the tire axial direction on a first end side, a second sipe piece extending in the tire axial direction on a second end side, and a third sipe piece inclined with respect to the tire axial direction and positioned between the first sipe piece and the second sipe piece. The closed sipes arranged in the tire axial direction overlap each other in the tire axial direction.

13 Claims, 15 Drawing Sheets

(52) U.S. Cl.
CPC ............... *B60C 2011/1213* (2013.01); *B60C 2011/1254* (2013.01)

(56) References Cited

U.S. PATENT DOCUMENTS

| | | | | |
|---|---|---|---|---|
| 5,824,169 | A | * 10/1998 | Landers | ............ B60C 11/0306 |
| | | | | 152/209.1 |
| 2002/0007889 | A1 | * 1/2002 | Eromaki | ............ B60C 11/12 |
| | | | | 152/209.17 |
| 2003/0029537 | A1 | 2/2003 | Iwamura | |
| 2003/0234065 | A1 | 12/2003 | Hashimoto et al. | |
| 2005/0109438 | A1 | * 5/2005 | Collette | ............ B60C 11/12 |
| | | | | 425/46 |
| 2005/0150581 | A1 | 7/2005 | Kishida | |
| 2009/0038723 | A1 | * 2/2009 | Thiebaud | ............ B60C 11/0306 |
| | | | | 152/209.18 |
| 2010/0154953 | A1 | 6/2010 | Kaji et al. | |
| 2019/0210410 | A1 | * 7/2019 | Tikka | ............ B60C 11/0306 |

FOREIGN PATENT DOCUMENTS

| | | | | |
|---|---|---|---|---|
| JP | 62-050206 A | * | 3/1987 | |
| JP | 04-310407 A | * | 11/1992 | ......... B60C 11/1218 |
| JP | 2000-255219 A | * | 9/2000 | ......... B60C 11/1218 |
| JP | 2000-289413 A | | 10/2000 | |
| JP | 2002-2235 A | | 1/2002 | |
| JP | 2003-25812 A | | 1/2003 | |
| JP | 2004-25954 A | | 1/2004 | |
| JP | 2004-306872 A | * | 11/2004 | ......... B60C 11/1218 |
| JP | 2005-193867 A | | 7/2005 | |
| JP | 2011-25837 A | | 2/2011 | |
| JP | 2011-245963 A | | 12/2011 | |
| JP | 2014-101114 A | | 6/2014 | |

OTHER PUBLICATIONS

Machine translation for JP 2000-255219 (Year: 2025).*
Machine translation for JP 04-310407 (Year: 2025).*
Machine translation for Japan 62-050206 (Year: 2025).*
Partial machine translation for EP 2862729 (Year: 2025).*
Machine translation for EP 2862729 (Year: 2025).*
Extended European Search Report for European Application No. 21864344.3, dated Jan. 30, 2024.
International Search Report for PCT/JP2021/032048 (PCT/ISA/210) mailed on Nov. 16, 2021.
Written Opinion of the International Searching Authority for PCT/JP2021/032048 (PCT/ISA/237) mailed on Nov. 16, 2021.

* cited by examiner

TIRE

TECHNICAL FIELD

The present disclosure relates to a tire.

BACKGROUND ART

Conventionally, there have been proposed various pneumatic tires in which linear or zigzag sipes are provided in land portions of a tread portion (see, for example, Patent Document 1 below). The sipes exert a road surface scratching force (edge effect) by their edges, and consequently enhance performance on ice.

Patent Document 1: Japanese Patent Application Publication No. 2003-025812

SUMMARY OF THE INVENTION

Problems to be Solved by the Invention

In general, high traction performance and braking performance on ice (Hereinafter, these may be collectively referred to as "braking/driving performance") are required. Therefore, in many cases, the land portions of the tread portion are provided with a plurality of sipes extending in the tire axial direction and arranged in the tire circumferential direction.

In recent years, on the other hand, as the performance of vehicles become improved, there is a demand for improved turning performance on ice.

Therefore, in some cases, in order to increase the frictional force in the tire axial direction, sipes including a component extending in the tire circumferential direction are arranged. When a plurality of such sipes are arranged in the tire circumferential direction, the number of the sipes which can be arranged per unit length in the tire circumferential direction of the land portion tends to decrease. Therefore, there is a possibility that the braking/driving performance on ice will be impaired.

In view of the above problems, the present disclosure has been devised, and a main problem is to provide a tire improved in braking/driving performance and turning performance on ice.

Means for Solving the Problem

The present disclosure is a tire including a tread portion, wherein the tread portion includes a land portion, in the land portion, a plurality of closed sipes having a width of not more than 1.5 mm are arranged in the tire axial direction, each of the closed sipes includes a first end, a second end, a first sipe piece extending in the tire axial direction on the first end side, a second sipe piece extending in the tire axial direction on the second end side, and a third sipe piece inclined with respect to the tire axial direction between the first sipe piece and the second sipe piece, and the closed sipes are arranged in the tire axial direction overlapping with each other in the tire axial direction and the tire circumferential direction.

Effect of the Invention

In the present disclosure, by adopting the above configurations, it is possible to exhibit excellent braking/driving performance and turning performance on ice.

DESCRIPTION OF THE SIGNS

| | |
|---|---|
| 2 | Tread portion |
| 4 | Land portion |
| 8 | Closed sipe |
| 8a | First end |
| 8b | Second end |
| 11 | First sipe piece |
| 12 | Second sipe piece |
| 13 | Third sipe piece |

Mode for Carrying Out the Invention

Figure 1:
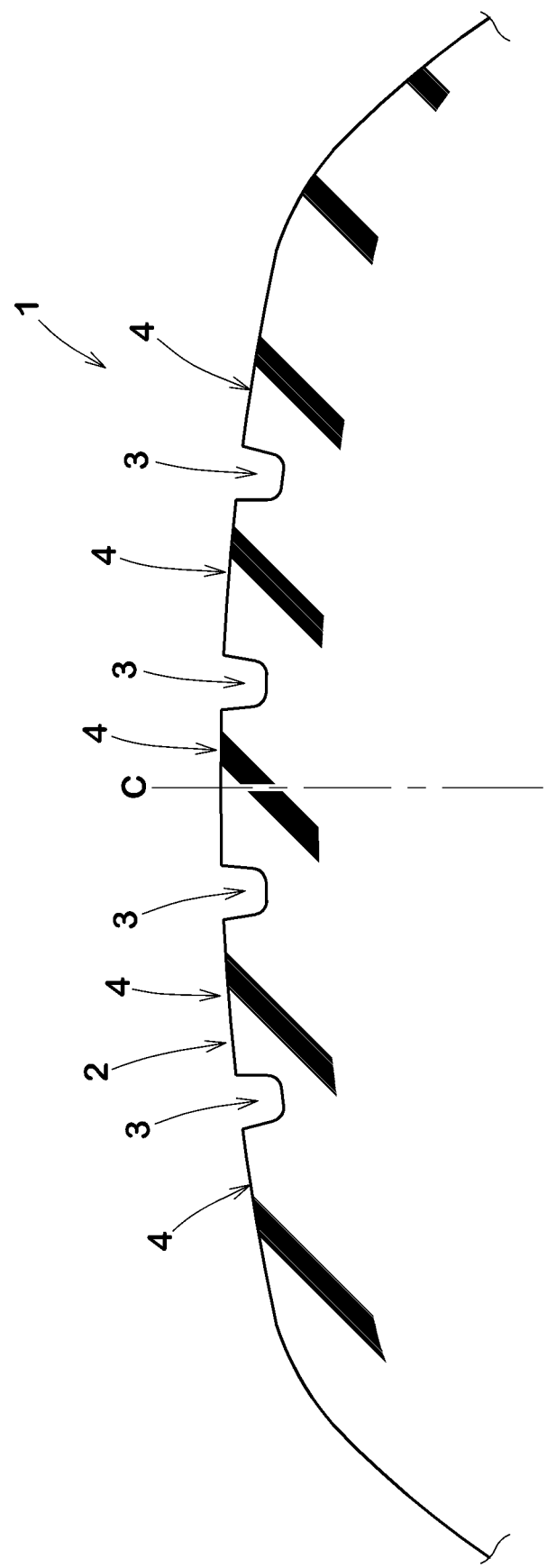
FIG. 1 is a cross-sectional view of a tread portion of a tire according to an embodiment of the present disclosure.

Hereinafter, an embodiment of the present disclosure will be described based on the drawings. FIG. 1 shows a cross-sectional view of a tread portion 2 of a tire 1 of the present embodiment. FIG. 1 is a meridian cross sectional view including the tire rotation axis, of the tire 1 under a normal state.

The tire 1 of the present embodiment is suitably used as, for example, a pneumatic tire for passenger cars. However, it is not limited to such an embodiment, and the tire 1 of the present disclosure may be used for heavy loads, for example.

In the case of a pneumatic tire for which various standards have been established, the "normal state" is a state in which the tire mounted on a regular rim is inflated to a regular internal pressure but loaded with no load.

In the case of tires for which various standards have not been established or non-pneumatic tires, the normal state means a standard usage state corresponding to the purpose of use of the tire and a no-load state.

In this specification, unless otherwise specified, dimensions and the like of various parts of the tire are the values measured under the normal state.

Each of the configurations described in this specification shall allow for normal errors involved in rubber molded products.

The "regular rim" is a rim defined for each tire by a standard in a standard system including the standard on which the tire is based, for example, "standard Rim" in JATMA, "Design Rim" in TRA, and "Measuring Rim" in ETRTO, The "regular internal pressure" is air pressure defined for each tire by a standard in a standard system including the standard on which the tire is based, for example, "MAXIMUM AIR PRESSURE" in JATMA, the maximum value listed in the table "TIRE LOAD LIMITS AT VARIOUS COLD INFLATION PRESSURES" in TRA, "INFLATION PRESSURE" in ETRTO.

As shown in FIG. 1, the tread portion 2 is provided with, for example, a plurality of main grooves 3 continuously extending in the tire circumferential direction, and a plurality of land portions 4 divided thereby.

Figure 2:
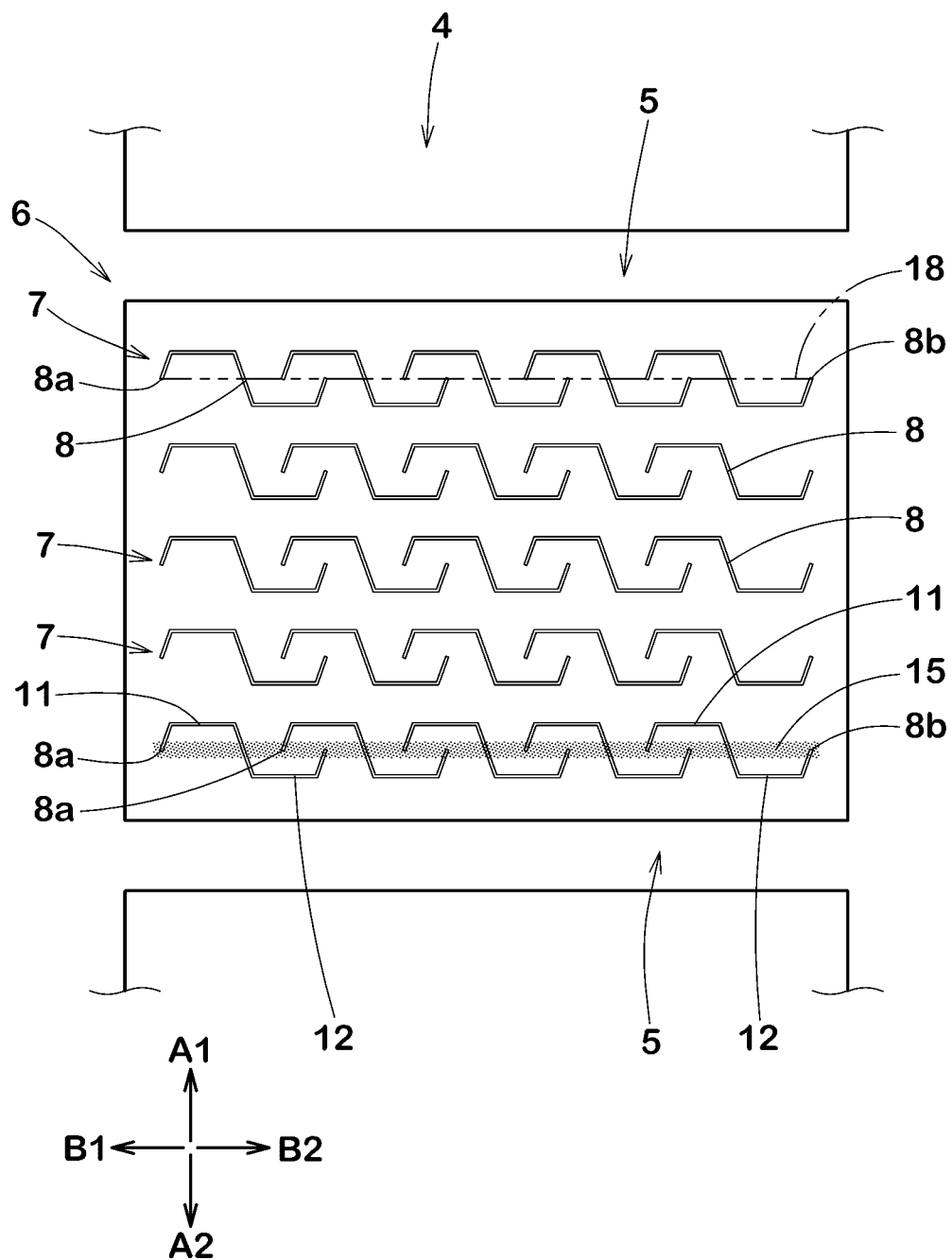
FIG. 2 is an enlarged plan view of a land portion in FIG. 1.

FIG. 2 shows an enlarged plan view of the land portion 4. As shown in FIG. 2, the land portion 4 of the present embodiment is configured, for example, as a row of blocks including a plurality of blocks 6 in the tire circumferential direction.

The blocks 6 are defined between a plurality of lateral grooves 5 crossing the land portion 4 in the tire axial direction.

The land portion 4 of the present disclosure is not limited to such an example, and may be a rib continuously extending in the tire circumferential direction, for example.

In some of the figures in this specification, there are indicated by arrows,
a first side A1 in the tire circumferential direction,
a second side A2 in the tire circumferential direction opposite thereto,
a first side B1 in the tire axial direction, and
a second side B2 in the tire axial direction opposite thereto. Unless otherwise noted, in the figures showing the plan views of the land portions 4,
the upward direction is the first side A1 in the tire circumferential direction,
the downward direction is the second side A2 in the tire circumferential direction,
the left direction is the first side B1 in the tire axial direction, and
the right direction is the second side B2 in the tire axial direction.

In the land portion 4, a plurality of closed sipes 8 are arranged in the tire axial direction.

In the present embodiment, a plurality of sipe groups 7 each made up of a plurality of closed sipes 8 is disposed in one block 6. For example, one sipe group 7 is made up of 3 to 7 closed sipes 8.

In this specification, the "sipe" is a slit having a minute width, and refers to that having a width of 1.5 mm or less between two sipe walls facing each other.

As a preferable mode, the above-said width of the closed sipe 8 of the present embodiment is 1.0 mm or less.

In addition, in this specification, the term "closed sipe" refers to a sipe whose both ends are terminated within the land portion 4.

The sipe group 7 provided in the block 6 of the present embodiment consists of the closed sipes 8 only. In other words, none of the sipes are connected to the edges of the block 6.

The present invention is however, not limited to such a mode, and the sipe arranged near the edge of the block 6 may be a non-closed sipe having one end opened at the edge.

Figure 3:
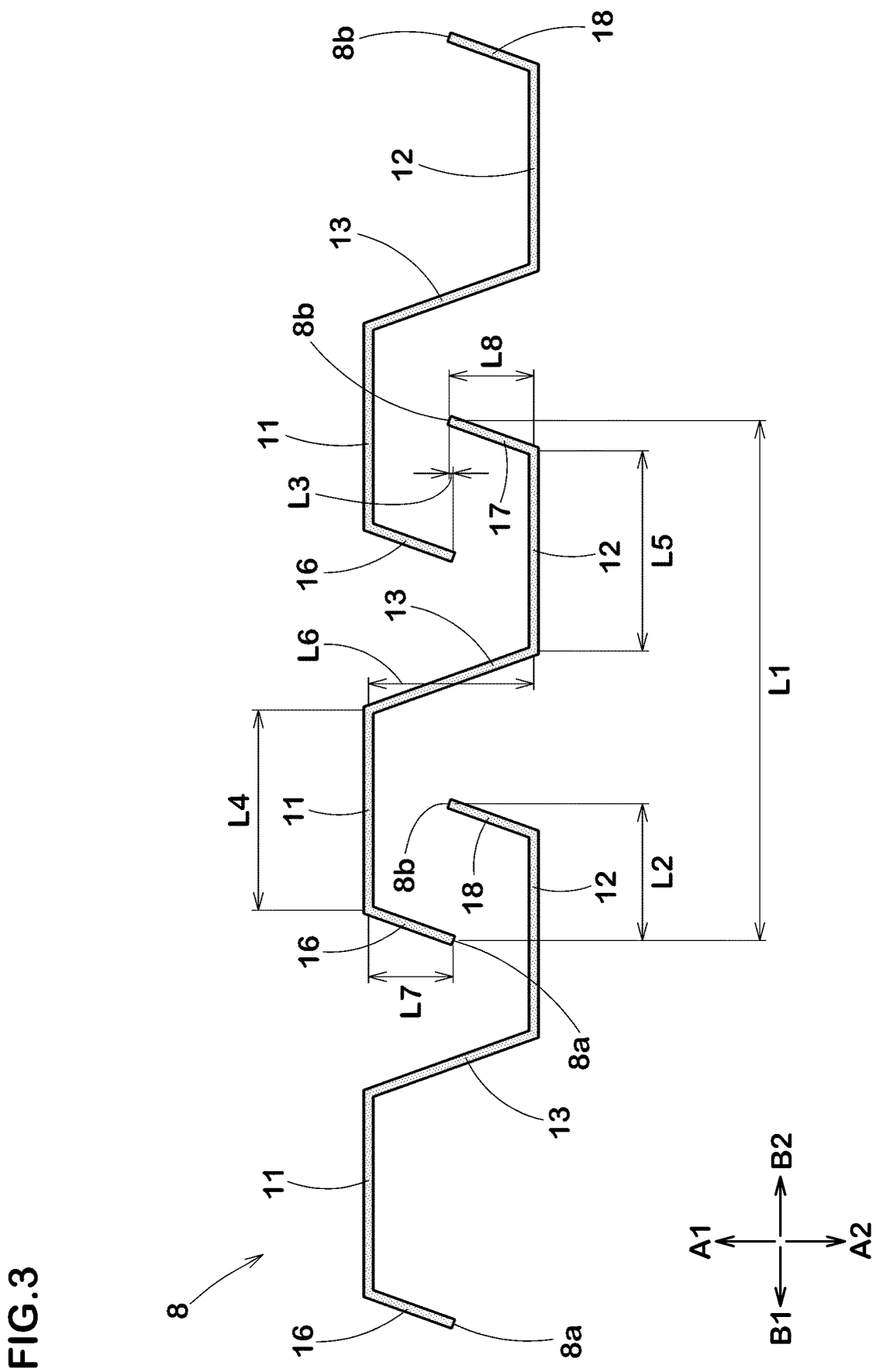
FIG. 3 is an enlarged view of a closed sipe in FIG. 2.

In FIG. 3, there is shown an enlarged view of the closed sipe 8 of FIG. 2.

As shown in FIG. 3, each closed sipe 8 comprises a first end 8a and a second end 8b, and a first sipe piece 11, a second sipe piece 12 and a third sipe piece 13.

The first end 8a is the end of the closed sipe 8 on the first side B1 in the tire axial direction.

The second end 8b is the end of the closed sipe 8 on the second side B2 in the tire axial direction.

The first sipe piece 11 extends in the tire axial direction on the first end 8a side of the third sipe piece 13.

The second sipe piece 12 extends in the tire axial direction on the second end 8b side of the third sipe piece 13.

Between the first sipe piece 11 and the second sipe piece 12, the third sipe piece 13 is inclined with respect to the tire axial direction.

with this arrangement, in the closed sipe 8 of the present embodiment, the first sipe piece 11 is positioned on the first side A1 in the tire circumferential direction and on the first side B1 in the tire axial direction of the second sipe piece 12. Further, in the present embodiment, the first sipe piece 11 continues to the third sipe piece 13 on the first side A1 in the tire circumferential direction.

The second sipe piece 12 continues to the third sipe piece 13 on the second side A2 in the tire circumferential direction.

The closed sipes 8 arranged in the tire axial direction overlap each other in the tire axial direction and the tire circumferential direction.

The expression "the closed sipes 8 overlap each other in the tire axial direction" means such a mode that a virtual region obtained by extending one closed sipe 8 parallel to the tire circumferential direction overlaps with the closed sipe 8 adjacent thereto.

The expression "the closed sipes 8 overlap each other in the tire circumferential direction" means such a mode that a virtual region obtained by extending one closed sipe 8 in parallel with the tire axial direction overlaps the closed sipe 8 adjacent thereto.

In the present disclosure, by adopting the above configurations, it is possible to exhibit excellent braking/driving performance and turning performance on ice. The reason for this is presumed to be the following mechanism.

The sipe group 7 of the present disclosure includes a plurality of closed sipes 8 arranged in the tire axial direction. Since the closed sipes 8 are difficult to open during braking and driving, they are less likely to be clogged with snow or ice inside, and the edge effect can be stably exhibited over a long period of time. Thus, the anti-snow clogging performance when running on snow is improved.

In addition, the closed sipes 8 increase the pattern rigidity of the land portion 4 and enhance the steering stability on dry road surfaces.

Further, since the third sipe piece 13 is inclined with respect to the tire axial direction, it exerts a frictional force in the tire axial direction on ice, thereby capable of improving turning performance on ice.

Furthermore, since the second sipe piece 12 of the closed sipe 8 overlaps the first sipe piece 11 of the closed sipe 8 adjacent in the tire axial direction and the tire circumferential direction, it is possible to provide many closed sipes 8 in the land portion 4, and excellent braking/driving performance can be exhibited on ice.

In the present embodiment, a virtual region obtained by extending the second sipe piece 12 of one closed sipe 8 parallel to the tire circumferential direction overlaps with the first sipe piece 11 of the closed sipe 8 adjacent thereto. Further, a virtual region obtained by extending the third sipe piece 13 of one closed sipe 8 parallel to the tire axial direction overlaps with the third sipe piece 13 of the closed sipe 8 adjacent thereto. The present disclosure is however, not limited to such a mode.

Hereinafter, a more detailed configuration of the present embodiment will be described.

As shown in FIG. 2, the sipe group 7 of the present embodiment extends along the tire axial direction, but may extend with a certain degree of inclination with respect to the tire axial direction.

Specifically, an virtual straight line 18 (indicated by a two-dot chain line), which connecting between a first end 8a of the closed sipe 8 provided at the end on the first side B1 in the tire axial direction, and a first end 8b of the closed sipe 8 provided at the end on the second side B2 in the tire axial direction, is, for example, 45 degrees or less, preferably 15 degrees or less, and more preferably 5 degrees or less with respect to the tire axial direction.

The sipe group 7 is however, not limited to such a mode, and can be changed according to the shape of the land portion, and as described later, for example, the virtual straight line 18 may extend obliquely.

As a further preferable mode, in the present embodiment, the first end 8a of each closed sipe 8 is placed in the same imaginary zone 15 (colored in FIG. 2) extending parallel to the tire axial direction with a minute width.

The width of the imaginary zone 15 is, for example, 3.0 mm or less. As a further preferable mode, the first ends 8a of the respective closed sipes 8 are placed on a same virtual straight line extending parallel to the tire axial direction.

Similarly, the second end 8b of each closed sipe 8 is placed in the same imaginary zone (not shown) extending parallel to the tire axial direction with a minute width.

The width of the imaginary zone is, for example, 3.0 mm or less.

As a further preferable mode, the second ends 8b of the respective closed sipes 8 are placed on a same virtual straight line extending parallel to the tire axial direction.

It is preferable that, as shown in FIG. 3, the overlapping length L2 of two closed sipes 8 adjacent to each other in the tire axial direction is 10% to 40% of the maximum length L1 in the tire axial direction of the closed sipe 8.

Thereby, excellent braking/driving performance is exhibited while maintaining the wear resistance of the land portion 4. If the overlapping length L2 is less than 10% of the length L1, the edge component in the tire axial direction disposed on the land portion 4 is reduced, and the braking/driving performance on ice may deteriorate.

If the overlapping length L2 exceeds 40% of the length L1, the clearance between two closed sipes 8 adjacent to each other becomes narrow, which may cause uneven wear of the land portion. Each length of the sipe is measured at the widthwise center line of the sipe.

The distance L3 in the tire circumferential direction between the second end 8b of one closed sipe 8 and the first end 8a of the closed sipe 8 adjacent thereto is, for example, not more than 10%, preferably not more than 5% of the length L6 in the tire circumferential direction the third sipe piece 13.

In the present embodiment, the second end 8b is positioned on the first side A1 in the tire circumferential direction than the first end 8a.

Thereby, a decrease in rigidity of the land portion 4 is suppressed, and wear resistance performance and steering stability on dry road surfaces are ensured.

In the present embodiment, the first end 8a and the second end 8b are located
 on the second side A2 in the tire circumferential direction of the first sipe piece 11, and on the first side A1 in the tire circumferential direction of the second sipe piece 12.

In other words, the first end 8a and the second end 8b are located within a region (not shown) formed by extending the third sipe piece 13 toward both sides in the tire axial direction in parallel with the tire axial direction.

Moreover, the closed sipe 8 of the present embodiment includes a first outer sipe piece 16 and a second outer sipe piece 17.

The first outer sipe piece 16 extends from the first end 8a to the first sipe piece 11.

The second outer sipe piece 17 extends from the second end 8b to the second sipe piece 12.

Such closed sipe 8 provides a large frictional force in the tire axial direction by means of the first outer sipe piece 16 and the second outer sipe piece 17, thereby enhancing turning performance on ice.

The angle between the first sipe piece 11 and the third sipe piece 13 and
 the angle between the second sipe piece 12 and the third sipe piece 13
 are each, for example, not less than 80 degrees, preferably not less than 90 degrees.

In the present embodiment. the above two angles are 100 to 120 degrees.

Thereby, wear at the bent portions of the closed sipe 8 is suppressed, and uneven wear resistance is improved.

From a similar point of view, the angle between the first sipe piece 11 and the first outer sipe piece 16 and the angle between the second sipe piece 12 and the second outer sipe piece are each, for example, not less than 80 degrees, preferably not less than 90 degrees. In the present embodiment, the above two angles are 100 to 120 degrees.

In this embodiment, each of the sipe pieces of the closed sipe 8 extends linearly.

For example, each of the sipe pieces may extend in a curved manner.

Each of the axial length L4 of the first sipe piece 11 and the axial length L5 of the second sipe piece 12 is greater than the axial length of the third sipe piece 13.

Each of the length L4 of the first sipe piece 11 and the length L5 of the second sipe piece 12 is 35% to 45% of the axial length L1 of the closed sipe 8.

The angle of the first sipe piece 11 with respect to the tire axial direction and the angle of the second sipe piece 12 with respect to the tire axial direction are, for example, in a range of +/−20 degrees, preferably in a range of +/−10 degrees. Each of the first sipe piece 11 and the second sipe piece 12 of the present embodiment extends parallel to the tire axial direction. Such first sipe piece 11 and second sipe piece 12 help to effectively enhance the braking/driving performance on ice.

As shown in FIG. 2, in a more preferable mode, the first sipe pieces 11 of the closed sipes 8 are arranged in a same imaginary zone (not shown) extending parallel to the tire axial direction with a minute width. The width of the imaginary zone is, for example, 3.0 mm or less.

In a more preferable mode, the first sipe pieces 11 of the closed sipes 8 are arranged on a same virtual straight line extending parallel to the tire axial direction.

Thereby, the braking/driving performance is improved while maintaining the uneven wear resistance performance.

Similarly, the second sipe pieces 12 of the closed sipes 8 are arranged in a same imaginary zone (not shown) extending parallel to the tire axial direction with a minute width. The width of the imaginary zone is, for example, 3.0 mm or less. In a more preferable mode, the second sipe pieces 12 of the closed sipes 8 are arranged on a same virtual straight line extending parallel to the tire axial direction.

As shown in FIG. 3, the length L6 in the tire circumferential direction of the third sipe piece 13 is, for example, smaller than the length L1 in the tire axial direction of the closed sipe 8.

The length L6 of the third sipe piece 13 is smaller than the length L4 in the tire axial direction of the first sipe piece 11 and the length L5 in the tire axial direction of the second sipe piece 12.

Specifically, the length L6 of the third sipe piece 13 is 25% to 40% of the length L1 of the closed sipe 8.

Such third sipe piece 13 enhances turning performance on ice while maintaining uneven wear resistance performance.

The third sipe piece 13, for example, is inclined to the second side A2 in the tire circumferential direction from the first sipe piece 11 toward the second side B2 in the tire axial direction.

The third sipe piece 13 is arranged at a larger angle with respect to the tire axial direction than the first sipe piece 11 and the second sipe piece 12.

However, the third sipe piece 13 may, for example, extend parallel to the tire circumferential direction.

The angle of the third sipe piece 13 of the present embodiment with respect to the tire axial direction is, for example, not less than 45 degrees, preferably 60 to 80 degrees. Such third sipe piece 13 improves turning performance on ice, while providing frictional force in the tire circumferential direction too.

As shown in FIG. 2, the closed sipes 8 of the present embodiment are arranged so that the third sipe pieces 13 become parallel to each other.

Thereby, the uneven wear resistance of the land portion 4 and the steering stability on dry road surfaces are improved.

As shown in FIG. 3, the length L7 in the tire circumferential direction of the first outer sipe piece 16 and the length L8 in the tire circumferential direction of the second outer sipe piece 17 are, for example, smaller than the length in the tire circumferential direction of the third sipe piece 13. The length L7 of the first outer sipe piece 16 and the length L8 of the second outer sipe piece 17 are preferably not more than 60%, more preferably 45% to 55% of the length L6 of the third sipe piece 13. This ensures a sufficient clearance between two closed sipes 8 adjacent to each other. Therefore, uneven wear resistance is maintained, and demoldability during vulcanization molding is ensured.

With respect to the tire circumferential direction, the first outer sipe piece 16 and the second outer sipe piece 17 are each inclined in a direction opposite to the third sipe piece 13. The angle of the first outer sipe piece 16 with respect to the tire circumferential direction and the angle of the second outer sipe piece 17 with respect to the tire circumferential direction are each, for example, not more than 45 degrees, preferably 10 to 30 degrees.

In a preferable mode, the angle of the first outer sipe piece 16 and the angle of the second outer sipe piece 17 are the same as the angle of the third sipe piece 13 with respect to the tire circumferential direction.

However, it is not limited to such mode, and the first outer sipe piece 16 and the second outer sipe piece 17 may extend parallel to the tire circumferential direction, for example.

In the present embodiment, in two closed sipes 8 adjacent in the tire axial direction, the second sipe piece 12 of the closed sipe 8 on one side overlaps in the tire axial direction with the first sipe piece 11 of the closed sipe 8 on the other side.

The second outer sipe piece 17 of the closed sipe 8 on one side extends from the second sipe piece 12 toward the first side A1 in the tire circumferential direction.

The first outer sipe piece 16 of the closed sipe 8 on the other side extends from the first sipe piece 11 toward the second side A2 in the tire circumferential direction.

Thereby, the above-described effects are exhibited more reliably.

Next, the internal configuration of the closed sipe 8 will be described.

Figure 4:
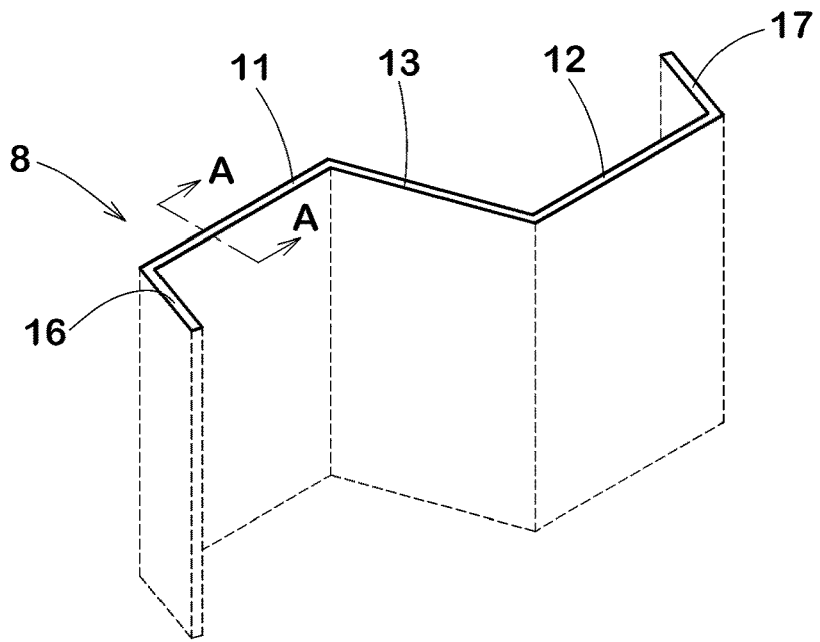
FIG. 4 is a see-through perspective view showing an example of the interior portion of the closed sipe.
Figure 5:
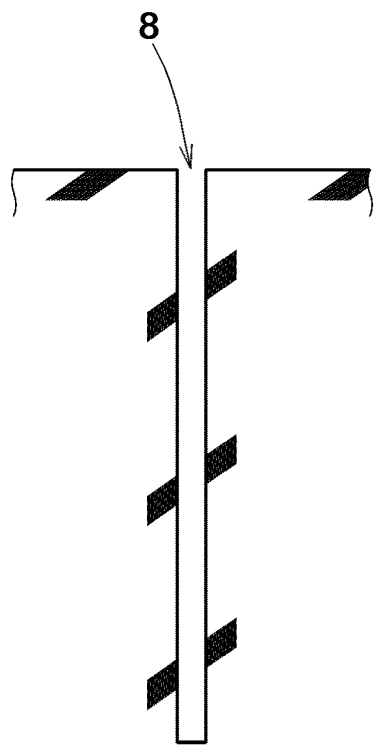
FIG. 5 is a cross-sectional view taken along line A-A of FIG. 4.

FIG. 4 shows a see-through perspective view showing an example of the interior portion of the closed sipe 8, and FIG. 5 shows a cross-sectional view taken along line A-A of FIG. 4. In this specification, in a see-through perspective view such as FIG. 4, the edges of the closed sipe 8 at the tread surface is indicated by a solid line, and the shape of the interior portion of the closed sipe 8 is indicated by a broken line.

As shown in FIGS. 4 and 5, in the present embodiment, the entire closed sipe 8 extends linearly in the tire radial direction in its sipe cross-section.

In the present disclosure, even if the cross-sectional shape of the sipe is linear as described above, the rigidity of the land portion 4 is maintained by the closed sipe 8 whose both ends are terminated within the land portion 4, therefore, sufficient steering stability and resistance to uneven wear are exhibited. On the other hand, the closed sipe 8 having such sipe cross section helps to improve demoldability during vulcanization molding, reduce the defect rate during tire production, and reduce manufacturing and maintenance costs for the vulcanization mold.

Figure 6:
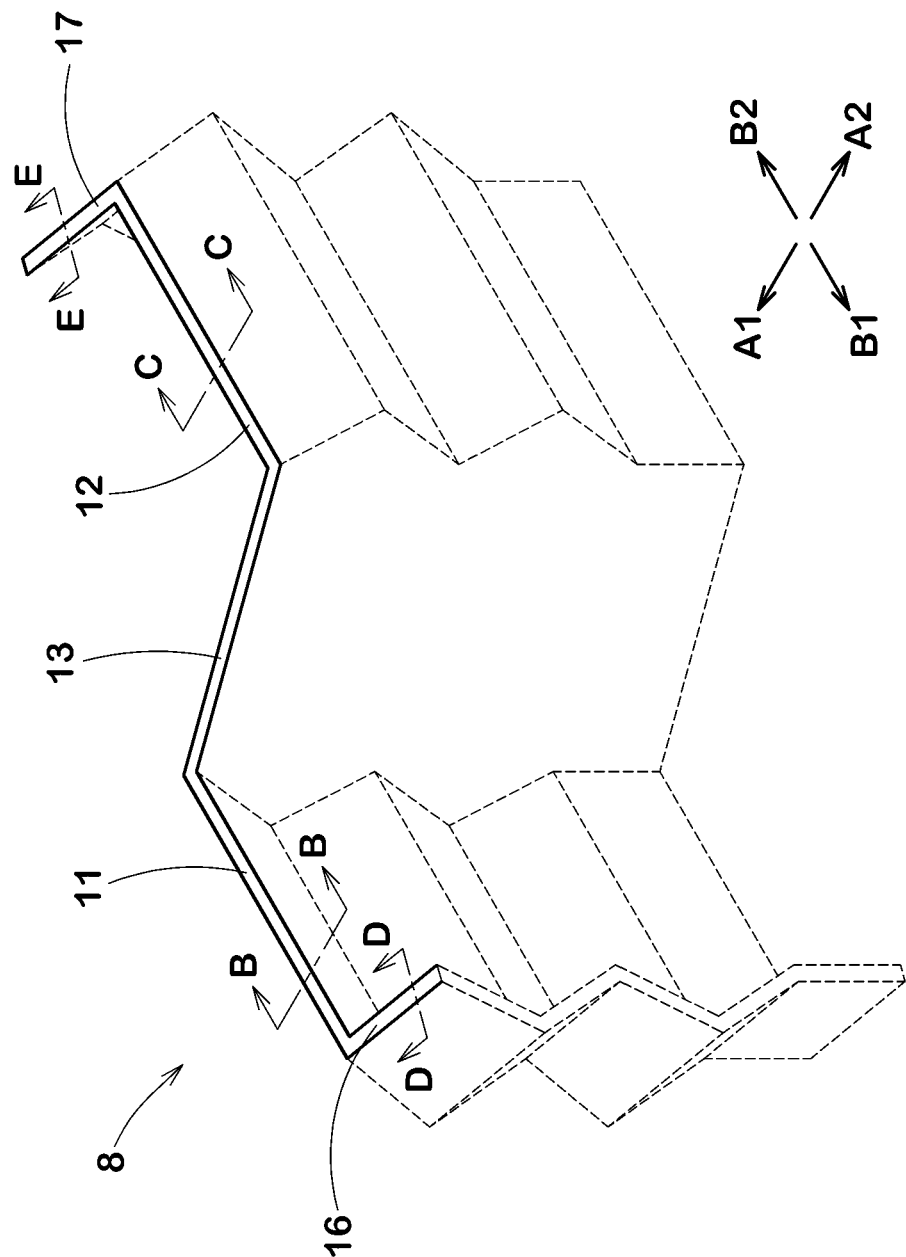
FIG. 6 is a see-through perspective view showing another example of the interior portion of the closed sipe.
Figure 7:
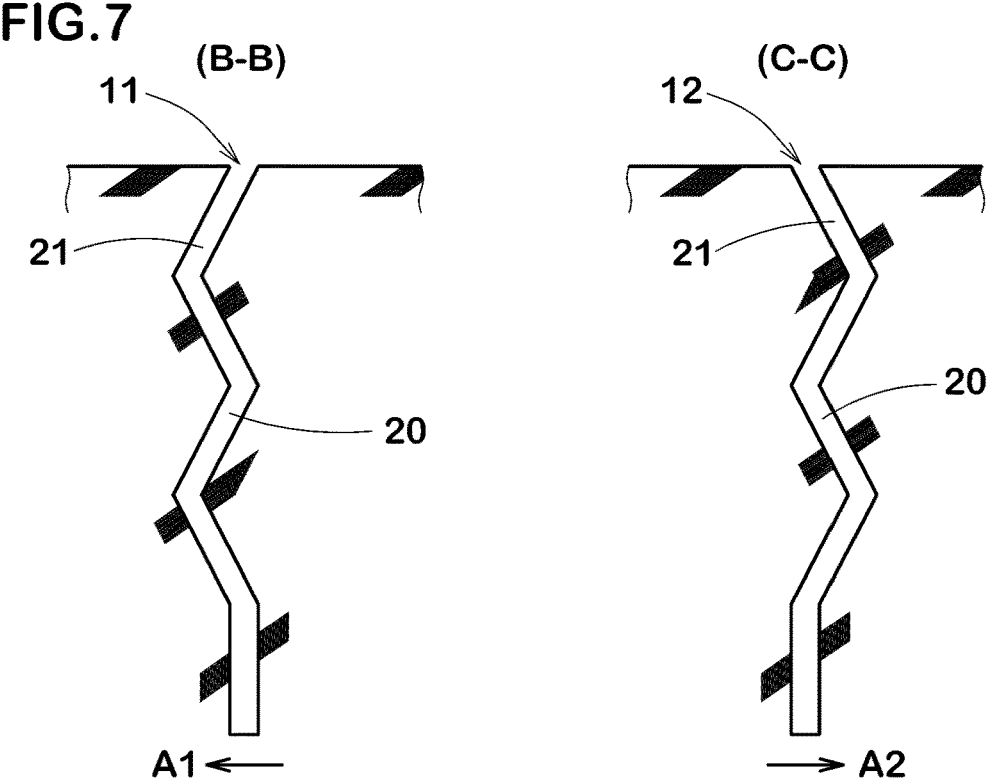
FIG. 7 is a sectional view taken along line B-B and a sectional view taken along line C-C of FIG. 6.

FIG. 6 shows a see-through perspective view showing another example of the interior portion of the closed sipe 8. FIG. 7 shows a B-B line cross-sectional view and a C-C line cross-sectional view of FIG. 6.

In the present embodiment, as shown in FIGS. 6 and 7, the first sipe piece 11 and the second sipe piece 12 are each configured as a bent portion 20 extending zigzag in the tire radial direction in the sipe cross section.

Such closed sipe 8 increases the rigidity of the land portion 4 in the tire circumferential direction, and can exhibit excellent braking/driving performance on ice.

The bent portion 20 includes an outer inclined portion 21 which continues to the edge of the closed sipe 8 and extends while inclining to one direction with respect to the tire radial direction.

In the embodiment shown in FIG. 6, the outer inclined portion 21 belonging to the first sipe piece 11 is inclined to the first side A1 in the tire circumferential direction toward the inside in the tire radial direction. Whereas the outer inclined portion 21 belonging to the second sipe piece 12 is inclined to the second side A2 in the tire circumferential direction toward the inside in the tire radial direction.

Thereby, a rubber portion surrounded by the first sipe piece 11, the third sipe piece 13 and the first outer sipe piece 16, and a rubber portion surrounded by the second sipe piece 12, the third sipe piece 13 and the second outer sipe piece 17, secure large volumes, and as a result, it is possible to suppress rubber chipping at the time of demolding during vulcanization molding.

Figure 8:
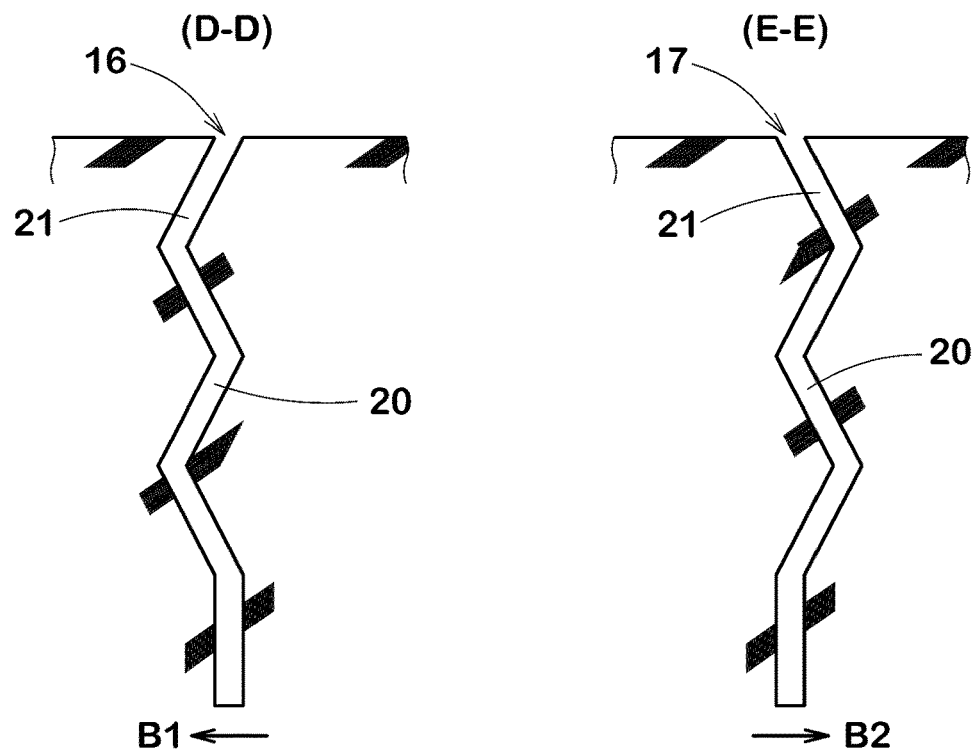
FIG. 8 is a sectional view taken along line D-D and a sectional view taken along line E-E of FIG. 6.

FIG. 8 shows a D-D line cross-sectional view and a E-E line cross-sectional view of FIG. 6.

As shown in FIGS. 6 and 8, in the present embodiment, each of the first outer sipe piece 16 and the second outer sipe piece 17 is configured as a bent portion 20 extending zigzag in the tire radial direction in the sipe cross-section.

Such closed sipe 8 increases the rigidity of the land portion 4 in the tire axial direction, and can exhibit excellent turning performance on ice.

In the embodiment shown in FIG. 6, the outer inclined portion 21 belonging to the first outer sipe piece 16 is inclined to the first side B1 in the tire axial direction toward the inside in the tire radial direction.

The outer inclined portion 21 belonging to the second outer sipe piece 17 is inclined to the second side B2 in the tire axial direction toward the inside in the tire radial direction. Thereby, it is possible to suppress rubber chipping at the time of demolding during vulcanization molding by the same mechanism as described above.

In the present disclosure, the configuration of the bent portion 20 can be varied depending on the purpose of the tire. In another embodiment, it may be possible that the first sipe piece 11 and the second sipe piece 12 have the cross-sectional shapes shown in FIG. 7, and other portions extend parallel to the tire radial direction, for example.

Such closed sipe 8 can exhibit excellent braking/driving performance on ice while improving demoldability during vulcanization molding.

In yet another embodiment, it may be possible that the first outer sipe piece 16 and the second outer sipe piece 17 have the cross-sectional shapes shown in FIG. 8, and other portions extend parallel to the tire radial direction, for example. Such closed sipe 8 can exhibit excellent turning performance on ice while improving demoldability during vulcanization molding.

Figure 9:
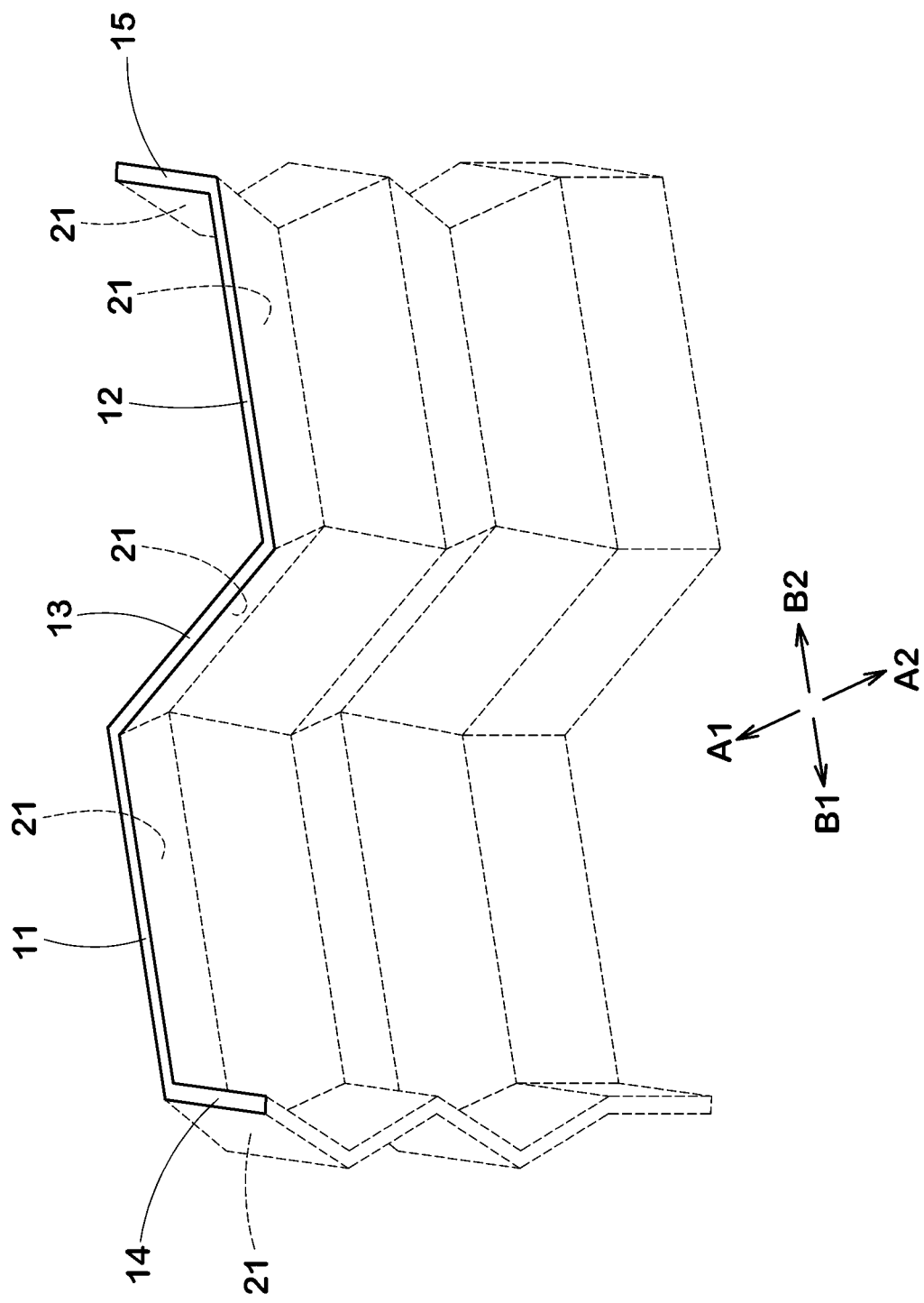
FIG. 9 is a see-through perspective view showing another example of the interior portion of the closed sipe.

FIG. 9 shows a see-through perspective view showing the interior portion of yet another closed sipe 8.

As shown in FIG. 9, in the present embodiment, each sipe piece of the closed sipe 8 is configured as a bent portion 20 extending in a zigzag shape in the tire radial direction.

Such closed sipe 8 when closed, can further increase the rigidity of the land portion 4, and can exhibit excellent uneven wear resistance performance.

In the embodiment shown in FIG. 9, the inclination directions of the outer inclined portions 21 of the respective sipe pieces interfere with each other.

Therefore, in the present embodiment, it is preferable that the outer inclined portions 21 have the following configuration. That is, in the present embodiment, the outer inclined portion 21 belonging to the first sipe piece 11 and the outer inclined portion 21 belonging to the second sipe piece 12 are each inclined to the first side A1 in the tire circumferential direction toward the inside in the tire radial direction.

In addition, the outer inclined portion 21 belonging to the first outer sipe piece 16 and the outer inclined portion 21 belonging to the second outer sipe piece 17 are each inclined to the first side B1 in the tire axial direction toward the inside in the tire radial direction.

Further, the outer inclined portion 21 belonging to the third sipe piece 13 is inclined to the second side B2 in the tire axial direction toward the inside in the tire radial direction. With the above configuration, each sipe piece is configured as the bent portion 20, and the above effects can be exhibited.

In the present disclosure, the closed sipe 8 having the planar shape shown in FIGS. 2 and 3 may have any of the cross-sectional shapes shown in FIGS. 4 to 10.

Figure 10:
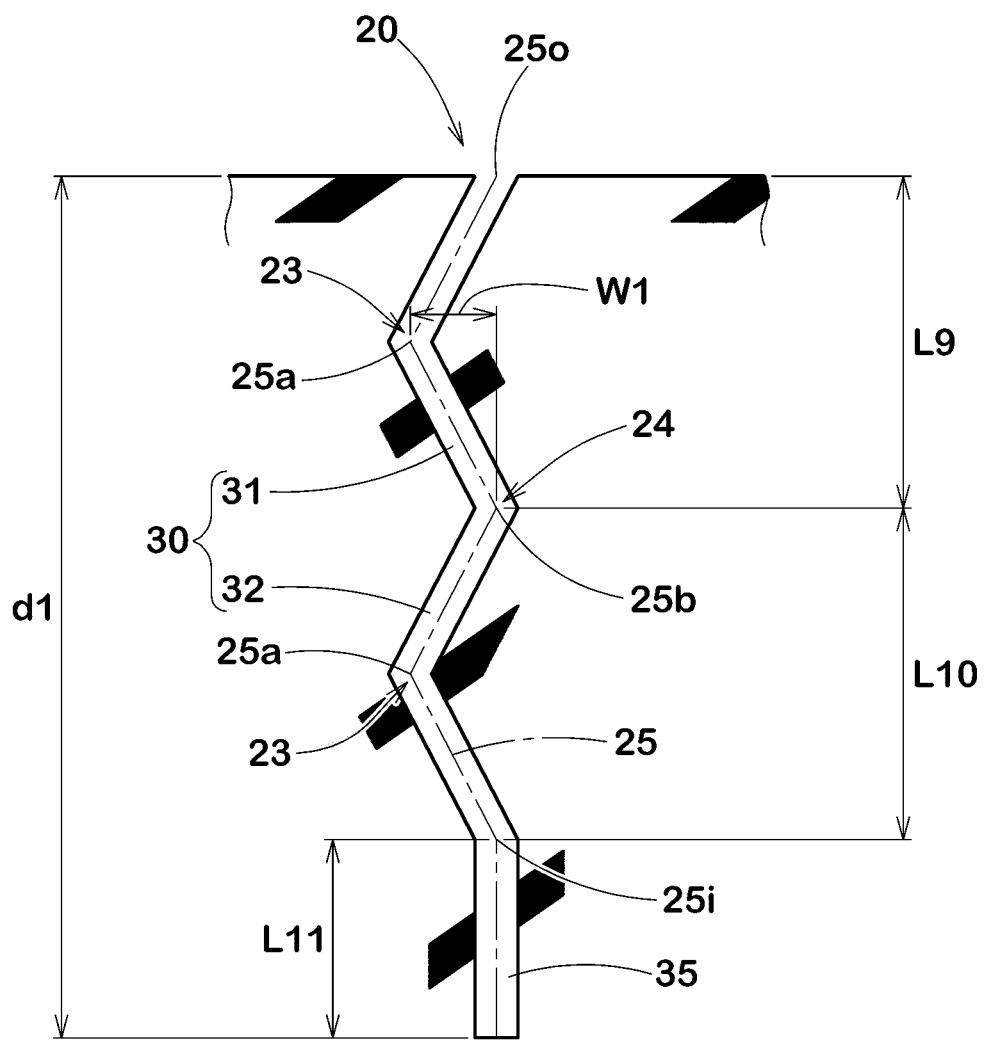
FIG. 10 is an enlarged sectional view of a bent portion.

In FIG. 10, there is shown an enlarged cross-sectional view of the bent portion 20. It is preferable that the bent portion 20 includes two or more first convex portions 23 which are convex toward one side as shown in FIG. 10.

The bent portion 20 of the present embodiment is constructed by two first convex portions 23, and one second convex portion 24 which is convex toward the other side between the two first convex portions 23.

The center line 25 in the width direction of the bent portion 20 comprises a first vertex 25a bent at the first convex portion 23 and a second vertex 25b bent at the second convex portion 24.

Moreover, it is preferable that a virtual straight line (not shown) connecting between both ends of the center line 25 of the bent portion 20 is parallel to the tire radial direction. Moreover, it is preferable that the second vertex 25b is positioned on the virtual straight line.

The center line 25 of the bent portion 20 includes an outer end 25o on the outer side in the tire radial direction, and an inner end 25i on the inner side in the tire radial direction. The bent portion 20 comprises two bent elements 30. The bent element 30 of the present embodiment is composed of a first bent element 31 from the outer end 25o to the second vertex 25b, and a second bent element 32 from the second vertex 25b to the inner end 25i.

In the present embodiment, the length L9 in the tire radial direction of the first bent element 31 (the distance in the tire radial direction from the outer end 25o to the second vertex 25b) and the length L10 in the tire radial direction of the second bent element 32 (the distance in the tire radial direction from the inner end 25i to the second vertex 25b) are the same as each other. Such bent portion 20 can uniformly improve traction performance and braking performance on ice.

The bending width w1 of the bent portion 20 (the distance in the width direction of the sipe from the first vertex 25a to the second vertex 25b) is, for example, 0.1 to 1.0 mm. Thereby, molding defects during vulcanization molding are suppressed while exhibiting the above-described effects.

It is preferable that the closed sipe 8 comprises a vertical portion 35 which continues to the inner side in the tire radial direction of the bent portion 20 and extends parallel to the tire radial direction.

The length L11 in the tire radial direction of the vertical portion 35 is, for example, 10% to 30% of the maximum depth d1 of the closed sipe 8.

Thereby, during vulcanization molding, a knife blade of the vulcanization mold for forming the bent portion 20 can easily pierce the raw rubber of the tire, thereby, deformation and breakage of the knife blade are suppressed.

Figure 11:
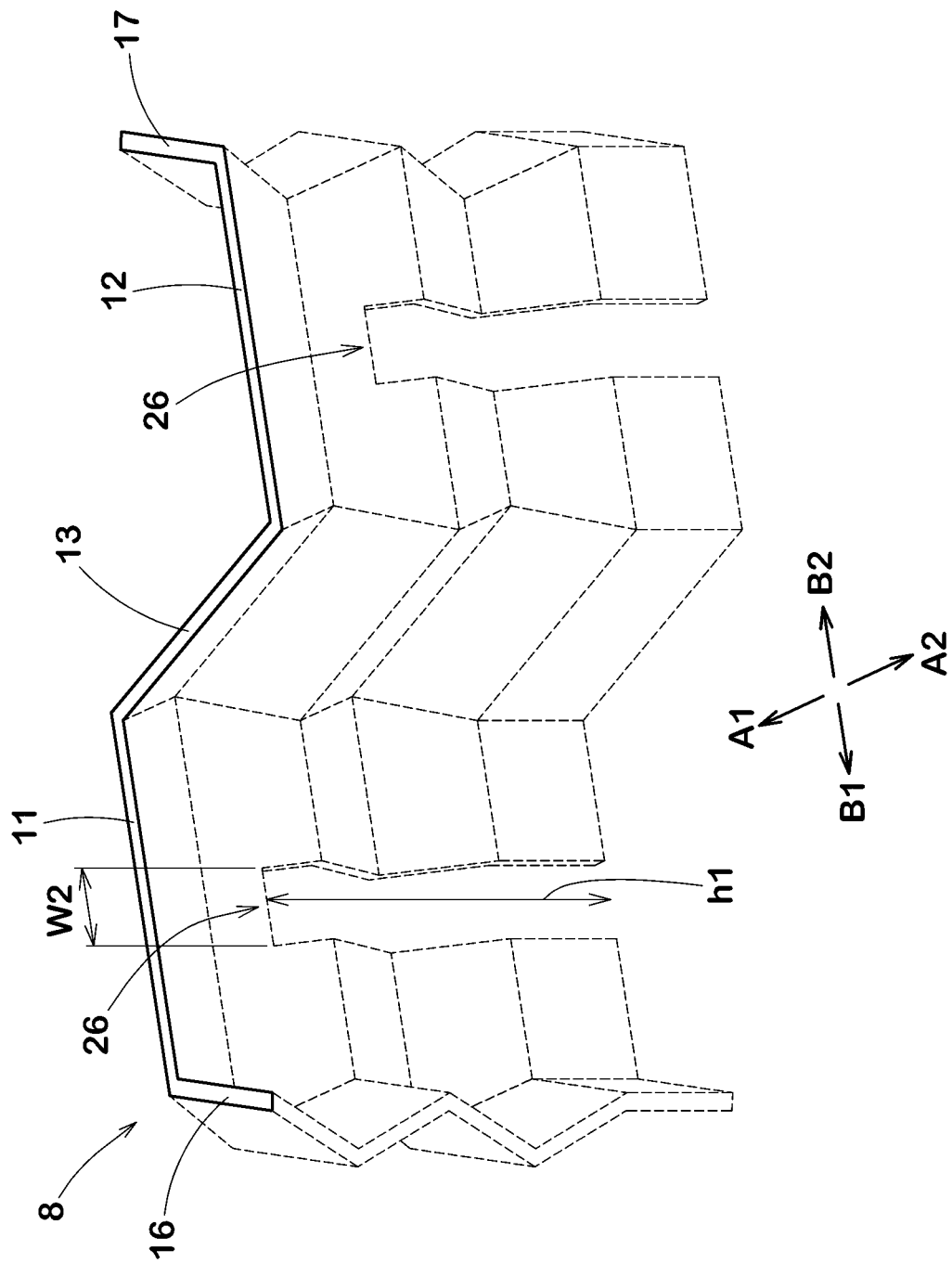
FIG. 11 is a see-through perspective view showing another example of the interior portion of the closed sipe.

FIG. 11 shows a see-through perspective view showing another example of the interior portion of the closed sipe 8.

As shown in FIG. 11, the closed sipe 8 of the present embodiment includes a connecting portion 26 in which sipe walls facing each other are partially connected with each other and which protrudes outward in the tire radial direction.

In general, when a sipe contact with the ground and a load in the tire circumferential direction is applied, shear deformation such that one sipe wall and the other sipe wall of the sipe are displaced in the depth direction of the sipe is likely to occur.

In addition, such deformation may lead to a decrease in the rigidity of the tread portion in the tire circumferential direction, which may lead to a decrease in braking performance on dry road surfaces and on ice, and uneven wear such as heel-and-toe wear around the sipes.

In addition, such uneven wear tends to make deterioration in tire performance due to wear more pronounced.

Since the closed sipe 8 shown in FIG. 11 can suppress the above-described deformation by the connecting portion 26, it is possible to improve steering stability and braking performance even on ice.

In addition, suppressing the deformation described above is highly effective in suppressing uneven wear (heel-and-toe wear). Therefore, the closed sipe 8 having the connecting portion 26 suppresses uneven wear, thereby reducing changes in tire performance due to wear, and thus it becomes possible to provide a tire capable of maintaining high safety over a long period of time.

In addition, since the above-described closed sipe 8 is difficult to open, the inside of the sipe is less likely to be clogged with snow during running.

Such action suppresses the swelling of the side wall of the block 6 provided with the closed sipes 8, so the volume of the groove separating the block 6 can be secured, thereby it becomes possible to suppress the deterioration of the performance on snow and ice.

The above-described deformation of the sipe tends to occur first in a portion of the sipe having a large component in the tire axial direction, and propagates to a portion of the sipe having a large component in the tire circumferential direction. Therefore, it is preferable to suppress the deformation in the portion of the sipe where the component in the tire axial direction is large.

From this point of view, it is preferable that the connecting portion 26 is provided on at least one of the first sipe piece 11 and the second sipe piece 12, for example.

In the present embodiment, as a more preferable mode, the connecting portion 26 is provided on each of the first sipe piece 11 and the second sipe piece 12. Thereby, the above-described effects can be surely obtained.

The height in the tire radial direction of the connecting portion 26 provided in the first sipe piece 11 is, for example, 80% to 120% of the height in the tire radial direction of the connecting portion 26 provided in the second sipe piece 12. Preferably, they are the same. Thereby, the rigidity around the closed sipe 8 is uniformly increased by the two connecting portions 26, and the above-described effects can be further improved.

The connecting portion 26 extends in the tire radial direction with a constant width, for example.

The width w2 of the connecting portion 26 provided in the first sipe piece 11 (the width along the length of the closed sipe 8) is preferably 10% to 50%, more preferably 20% to 30% of the length L4 (shown in FIG. 3) of the first sipe piece 11.

The width of the connecting portion 26 provided on the second sipe piece 12 is set in the same range in relation to the length L5 (shown in FIG. 3) of the second sipe piece 12.

Thereby, the above effects can be sufficiently exhibited while maintaining the frictional force provided by the edges of the closed sipe 8.

when the width of the connecting portion 26 changes in the tire radial direction, the width is measured at the center position in the tire radial direction of the connecting portion 26.

Figure 12:
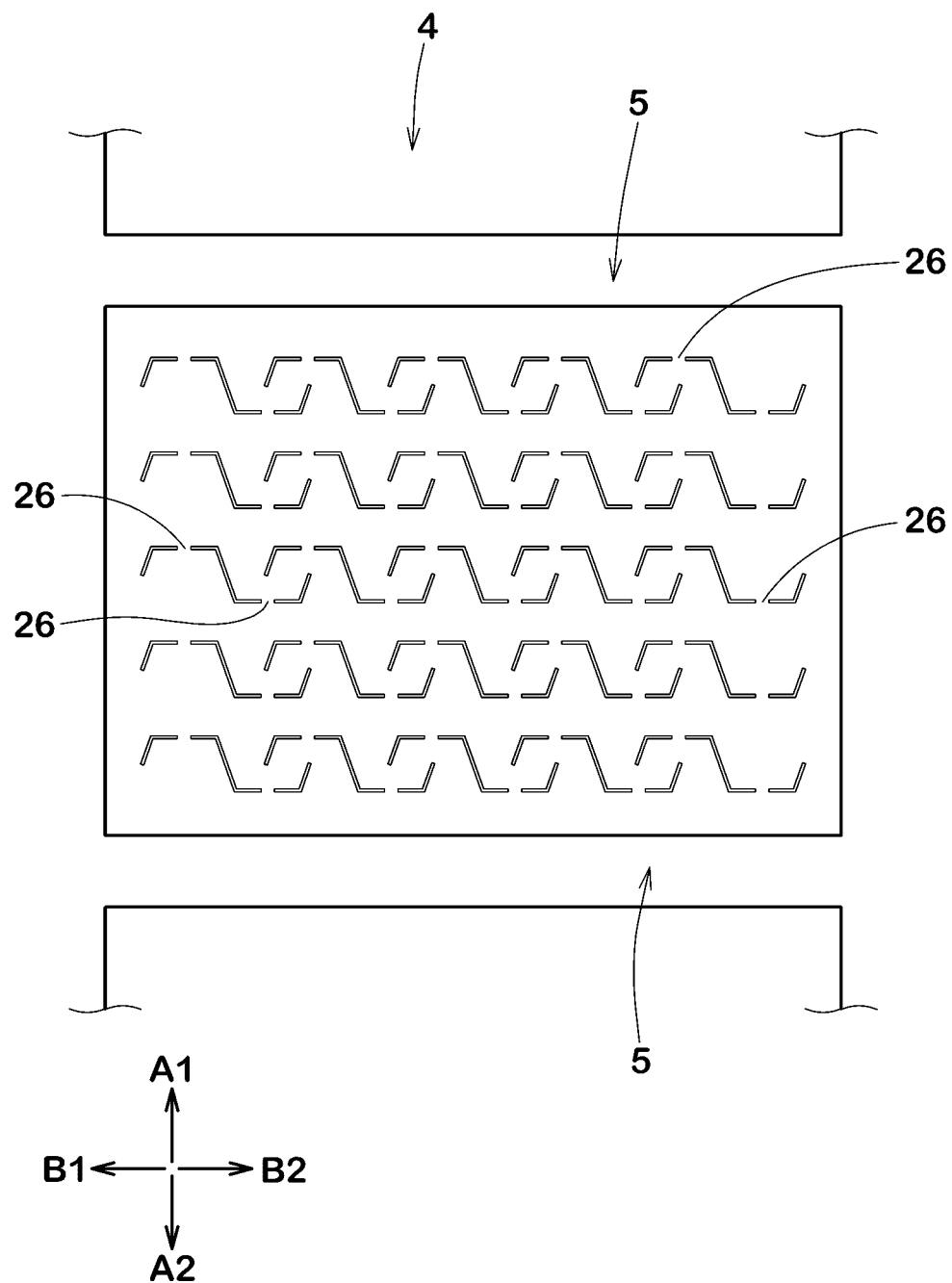
FIG. 12 is an enlarged plan view of the land portion provided with the closed sipes shown in FIG. 11 when the land portion is worn.

The height h1 in the tire radial direction of the connecting portion 26 is, for example, 10% to 90% of the maximum depth d1 (shown in FIG. 10) of the closed sipe 8. On the other hand, it is preferable that the height h1 is appropriately determined according to the purpose of the tire. This is because, as shown in FIG. 12, when the land portion 4 provided with the closed sipe 8 having the connecting portion 26 is worn, the connecting portion 26 is exposed and the edge component of the closed sipe 8 is reduced.

From this point of view, as shown in FIG. 11, in the case of a winter tire emphasizing on-snow performance, it is preferable that the height h1 is 20% to 40% of the maximum depth d1 of the closed sipe 8. On the other hand, in the case of an all-season tire for year-round use, it is preferable that the height h1 is 50% to 70% of the depth d1. Thereby, performance appropriate to the purpose of the tire can be obtained.

Figure 13:
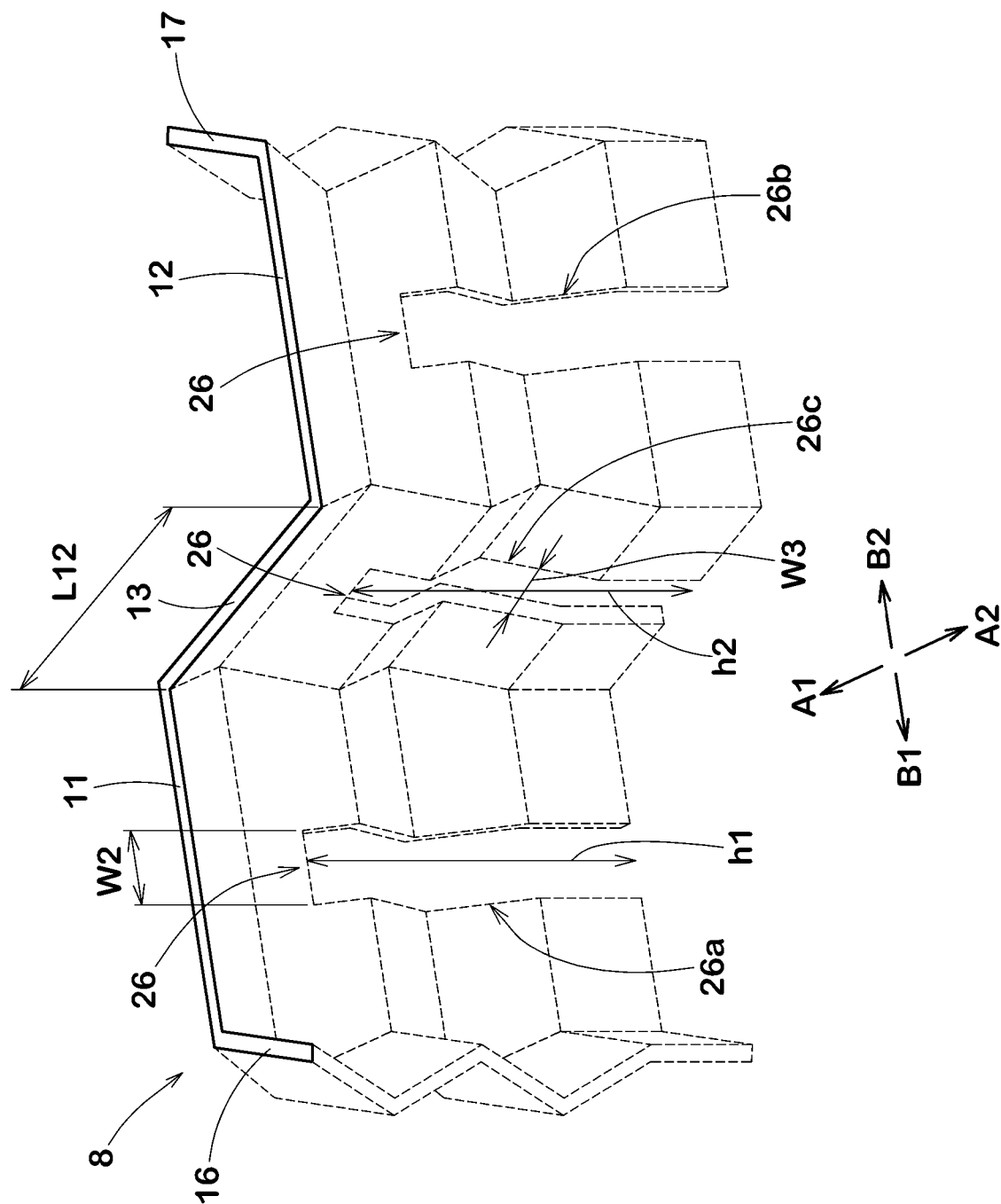
FIG. 13 is a see-through perspective view showing still another example of the interior portion of the closed sipe.

In FIG. 13, there is shown a see-through perspective view showing still another example of the interior portion of the closed sipe 8.

In the present embodiment, the closed sipe 8 is provided with connecting portions 26 in the first sipe piece 11 and the second sipe piece 12 as in the embodiment shown in FIG. 11, and further, the third sipe piece 13 is also provided with a connecting portion 26.

In the embodiment of FIG. 13, as the third sipe piece 13 is also provided with the connecting portion 26, deformation of the closed sipe 8 in the tire axial direction is further suppressed. Therefore, further improvements in steering stability and turning performance on ice can be expected.

Hereinafter, in the embodiment shown in FIG. 13, the connecting portion 26 provided in the first sipe piece 11 may be referred to as a first connecting portion 26a, the connecting portion 26 provided in the second sipe piece 12 as a second connecting portion 26b, and the connecting portion 26 provided in the third sipe piece 13 as a third connecting portion 26c.

To the first connecting portion 26a and the second connecting portion 26b shown in FIG. 13, the configurations of the connecting portions 26 shown in FIG. 11 can be applied, and the descriptions thereof will be omitted here.

Further, in a preferred mode, the first connecting portion 26a and the second connecting portion 26b have substantially the same configuration. Thereby, progress of wear becomes uniform around the first sipe piece 11 and around the second sipe piece 12, and uneven wear is suppressed.

Figure 14:
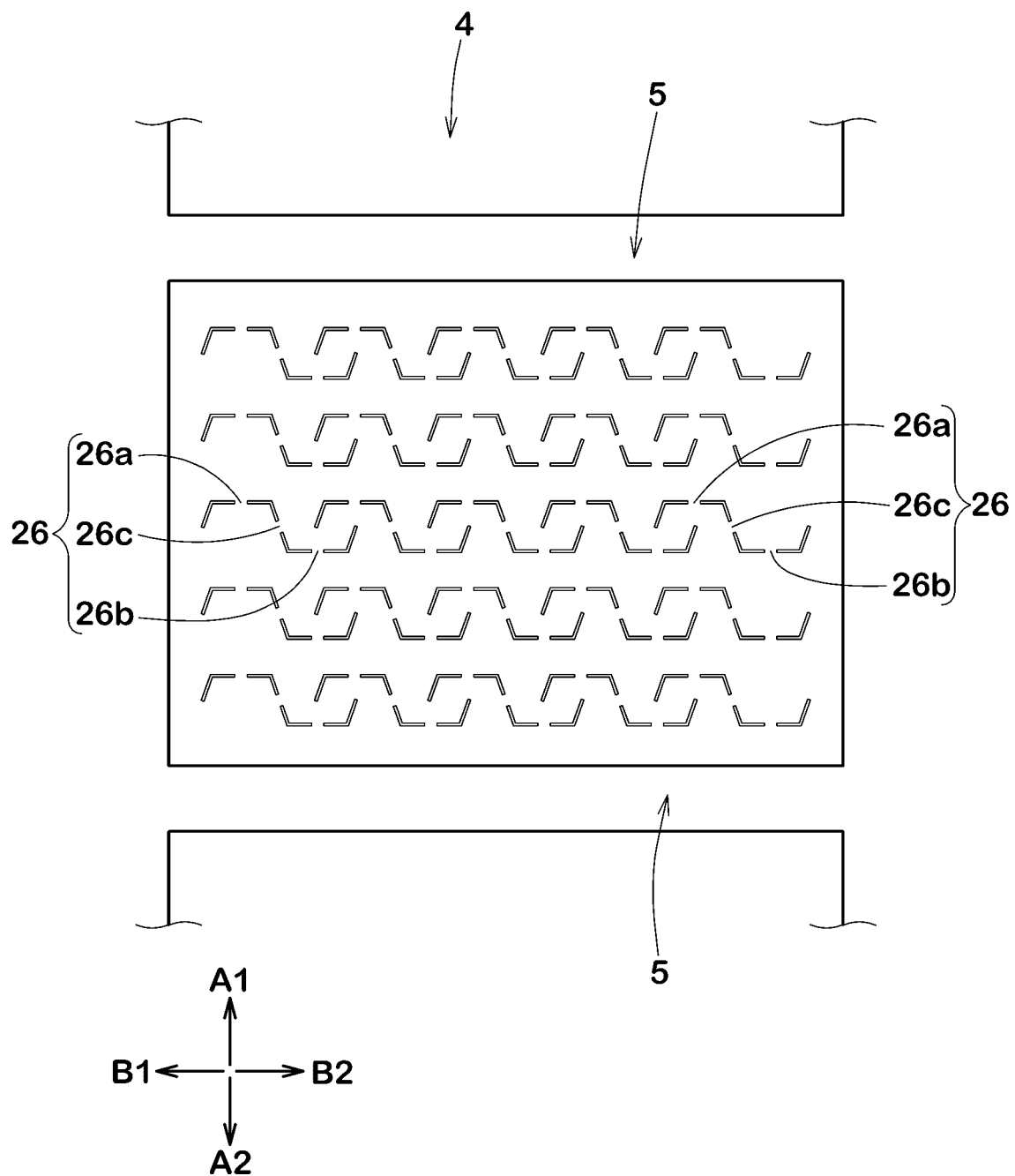
FIG. 14 is an enlarged plan view of the land portion provided with the closed sipes shown in FIG. 13 when the land portion is worn.

The height h2 of the third connecting portion 26c is, for example, 10% to 90% of the maximum depth d1 (shown in FIG. 10) of the closed sipe 8.

on the other hand, it is preferable that the height h2 is appropriately determined according to the purpose of the tire. This is because, as shown in FIG. 14, when the land portion 4 provided with the closed sipe 8 having the connecting portion 26 is worn, the first connecting portion 26a, the second connecting portion 26b, and the third connecting portion 26c are exposed, and the edge component of the closed sipe 8 is reduced.

From this point of view, as shown in FIG. 13, in the case of a winter tire emphasizing on-snow performance, it is preferable that the height h2 is 20% to 40% of the maximum depth d1 of the closed sipe 8.
on the other hand, in the case of an all-season tire for year-round use, it is preferable that the height h2 is 50% to 70% of the depth d1. Thereby, performance appropriate to the purpose of the tire can be obtained.

Further, the height h2 of the third connecting portion 26c is, for example, 40% to 100% of the height h1 of the first connecting portion 26a or the second connecting portion 26b. In a more desirable mode, the height h1 is the same as the height h2. Thereby, uneven wear is further suppressed.

The width w3 of the third connecting portion 26c (the width along the length direction of the closed sipe 8) is, for example, 10% to 50%, preferably 20% to 30% of the length L12 of the third sipe piece 13 (the length along the length direction of the closed sipe 8). In a more preferable mode, the widths w2 of the first connecting portion 26a and the second connecting portion 26b and the width w3 of the third connecting portion 26c are the same. Thereby, it is possible to further suppress uneven wear around the closed sipe 8.

Figure 15:
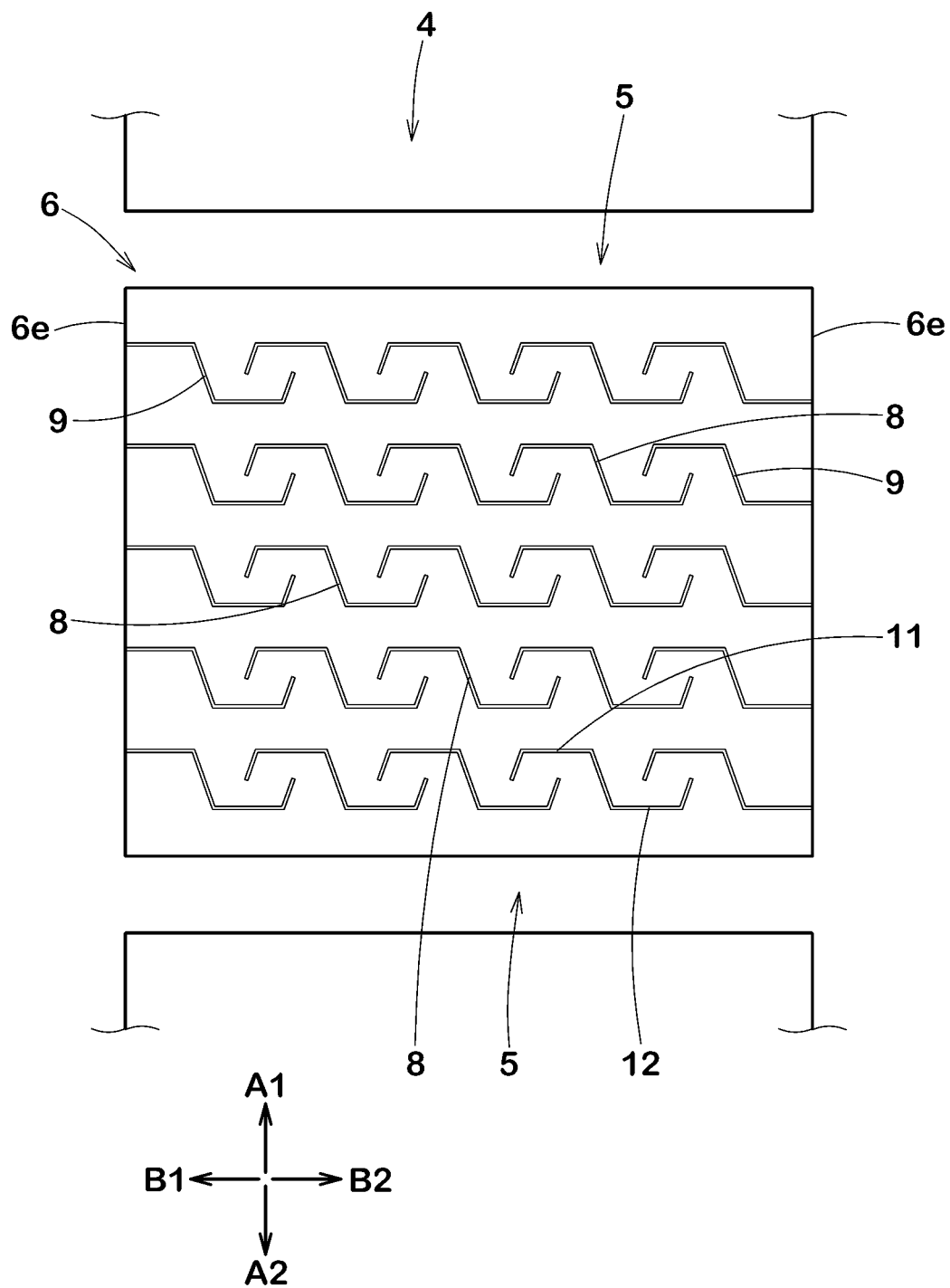
FIG. 15 is an enlarged plan view of a land portion of another embodiment of the present disclosure.
Figure 16:
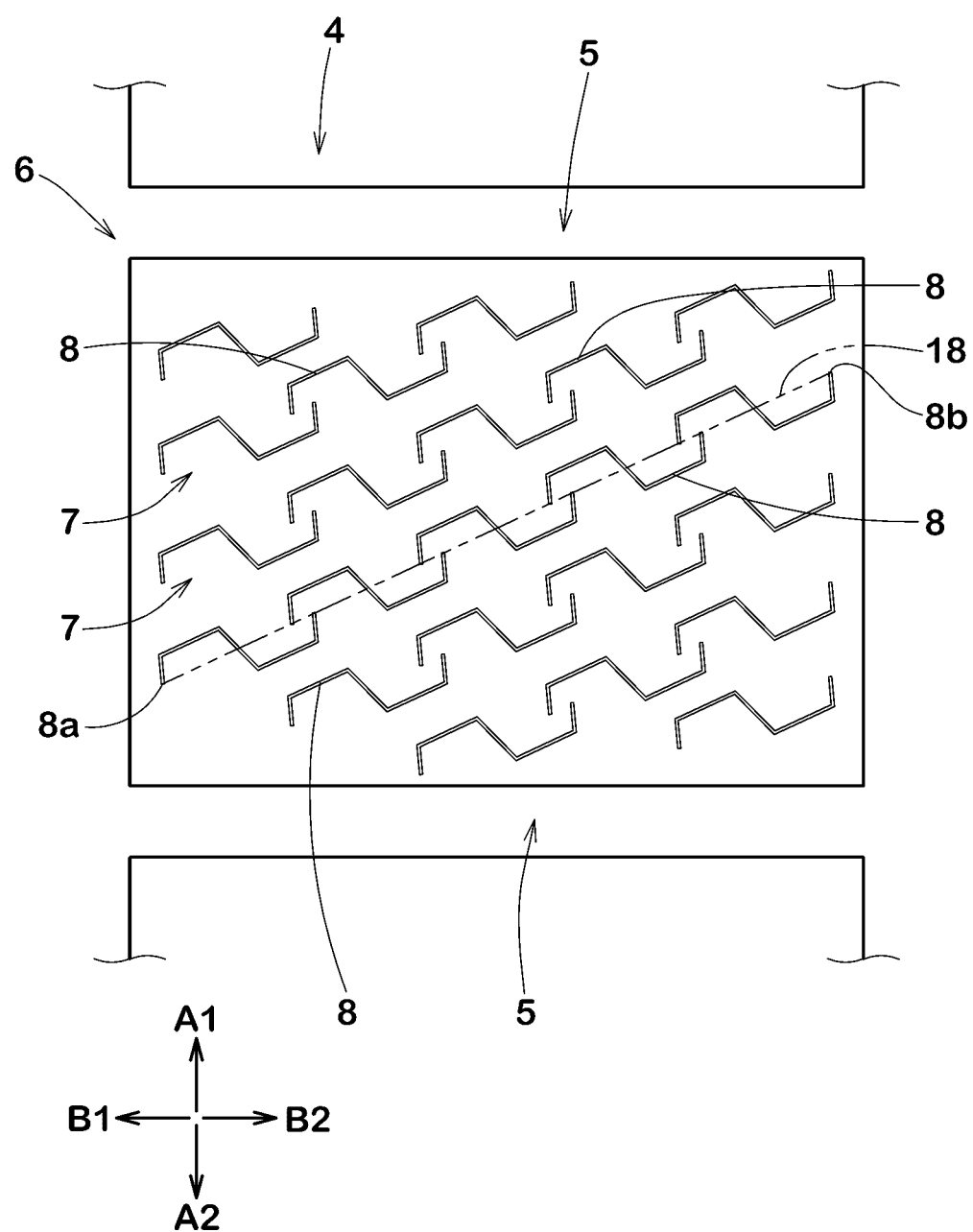
FIG. 16 is an enlarged plan view of a land portion of another embodiment of the present disclosure.

In FIGS. 15 and 16, there are shown enlarged plan views of land portions of other embodiments of the present disclosure. In FIGS. 15 and 16, the same reference numerals are assigned to the configurations described above, and descriptions thereof are omitted here.

In the embodiment shown in FIG. 15, a sipe, which is adjacent to a longitudinal edge 6e extending in the tire circumferential direction of the block 6, is configured as a non-closed sipe 9 communicating with the longitudinal edge 6e.
The non-closed sipe 9 of the present embodiment has, for example, such a shape that the closed sipe 8 communicates with the longitudinal edge 6e at the first sipe piece 11 or the second sipe piece 12.
Such sipe configuration helps to further improve the braking/driving performance on ice.

The block 6 of the embodiment shown in FIG. 16 is provided with a sipe group 7 of closed sipes 8 arranged obliquely with respect to the tire axial direction.
Specifically, a virtual straight line 18 (indicated by a two-dot chain line), which connects between a first end 8a of the closed sipe 8 provided at the end on the first side B1 in the tire axial direction and a second end 8b of the closed sipe 8 provided at the end on the second side B2 in the tire axial direction, is, for example, 10 to 45 degrees with respect to the tire axial direction. In this embodiment, especially, turning performance on ice is improved.

It is preferable that the closed sipes 8 of the present disclosure are provided in at least shoulder blocks.
The shoulder block is a block included in a shoulder land portion located on the outermost side in the tire axial direction of the tread portion 2.

In general, when braking on a dry road surface, a large load tends to act on the shoulder blocks, and the rigidity of the shoulder blocks in the tire circumferential direction tends to be insufficient.
In other words, in order to improve braking performance on dry road surfaces, it is important to improve the rigidity in the tire circumferential direction of the shoulder blocks.

On the other hand, the closed sipes 8 of the present disclosure can be expected to increase block stiffness compared to conventional sipes.
Therefore, by providing the closed sipes 8 of the present disclosure in the shoulder blocks, the braking performance on dry road surfaces can be effectively improved.
In particular, the closed sipe 8 including the connecting portions 26 shown in FIG. 11 or 13 can reliably increase the rigidity of the block and further improve the braking performance on dry road surfaces.

While the tire of one embodiment of the present disclosure has been described in detail above, the present disclosure is not limited to the specific embodiment described above and may be practiced with various modifications.

EXAMPLES

Figure 17:
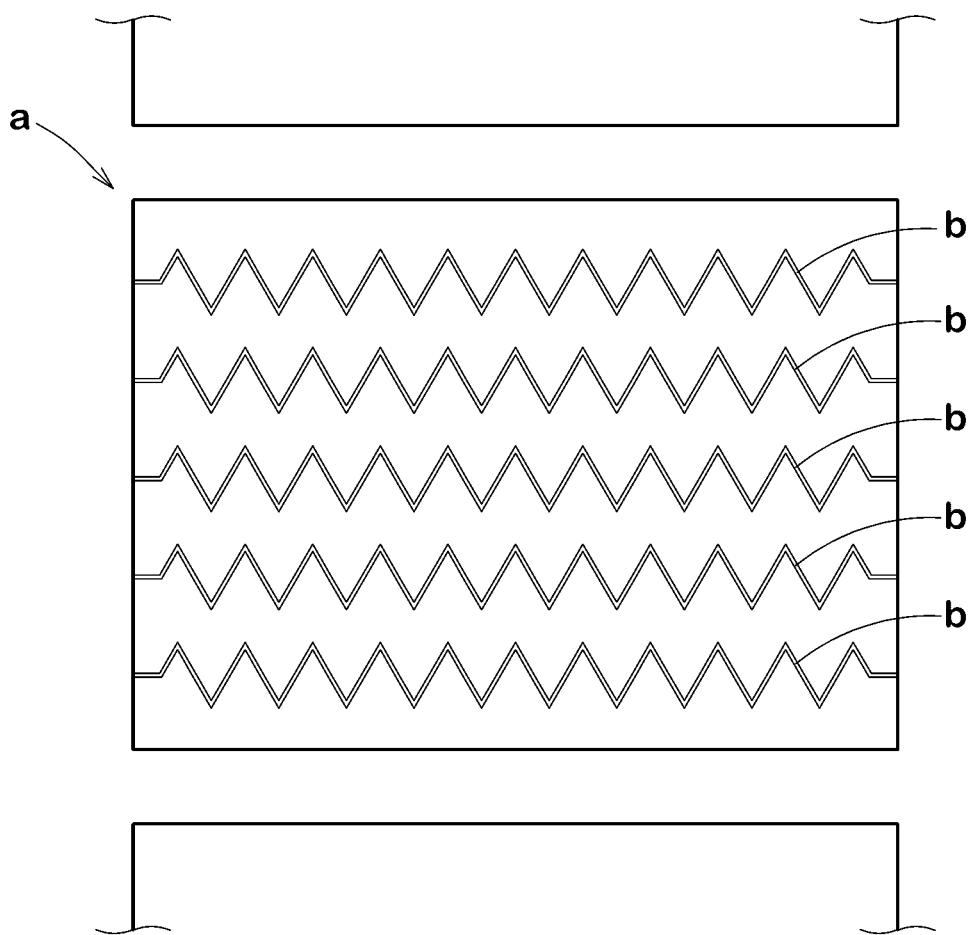
FIG. 17 is an enlarged plan view of a land portion of a tire as a comparative example.

Pneumatic tires of size 195/65R15 having the above-described sipe group were experimentally manufactured based on the specifications in Table 1.
As a comparative example, a tire in which a block a was provided with a plurality of sipes b extending in a zigzag pattern as shown in FIG. 17, was experimentally manufactured. The sipe b of the comparative example extends linearly in the tire radial direction as a whole.
Each test tire had substantially the same configuration, except for the shape of the sipe.
Each test tire was tested for traction performance on ice, braking performance on ice, and turning performance on ice. Common specifications to the test tires and test methods are as follows.
Mounted rim: 15×6.077
Tire internal pressure: Front wheel 230 kPa, rear wheel 230 kPa
Test vehicle: Displacement 1500 cc, front-wheel drive vehicle
Tire mounting position: All wheels
<Traction Performance on Ice>
When the test vehicle on which each test tire was mounted was run on an ice road, the traction performance was evaluated by the driver's senses.
The results are grades based on the traction performance of the comparative example being 100, and a higher value indicates better traction performance on ice.
<Braking Performance on Ice>
When the test vehicle on which each test tire was mounted was run on the ice road, the braking performance was evaluated by the driver's senses.
The results are grades based on the braking performance of the comparative example being 100, and a higher value indicates better braking performance on ice.
<Turning Performance on Ice>
When the test vehicle on which each test tire was mounted was run on the ice road, the turning performance was evaluated by the driver's senses.
The results are grades based on the turning performance of the comparative example being 100, and a higher value indicates better turning performance on ice.
The results of the tests are shown in Table 1.

TABLE 1

|  | Comparative example | Example 1 | Example 2 | Example 3 | Example 4 | Example 5 | Example 6 | Example 7 | Example 8 | Example 9 |
|---|---|---|---|---|---|---|---|---|---|---|
| Figures showing shape of sipe in plan view | FIG. 17 | FIG. 2 | FIG. 2 | FIG. 2 | FIG. 2 | FIG. 2 | FIG. 2 | FIG. 2 | FIG. 2 | FIG. 2 |
| Figures showing shape of interior portion of sipe | — | FIG. 6 | FIG. 6 | FIG. 6 | FIG. 6 | FIG. 6 | FIG. 4 | FIG. 9 | FIG. 11 | FIG. 13 |

TABLE 1-continued

|  | Comparative example | Example 1 | Example 2 | Example 3 | Example 4 | Example 5 | Example 6 | Example 7 | Example 8 | Example 9 |
|---|---|---|---|---|---|---|---|---|---|---|
| Overlapping length L2/Sipe length L1 (%) | — | 25 | 10 | 20 | 30 | 40 | 25 | 25 | 25 | 25 |
| Traction Performance on Ice (grade) | 100 | 108 | 102 | 106 | 109 | 110 | 103 | 107 | 108 | 108 |
| Braking Performance on Ice (grade) | 100 | 108 | 102 | 106 | 109 | 110 | 103 | 107 | 108 | 108 |
| Turning performance on ice (grade) | 100 | 105 | 105 | 105 | 105 | 105 | 103 | 106 | 106 | 107 |

As a result of the tests, it was confirmed that each example tire had improved braking/driving performance and turning performance on ice as compared to the comparative example.

Additional Statement

The present disclosure includes the following modes.

Present Disclosure 1

A tire including a tread portion, wherein the tread portion includes a land portion,
in the land portion, a plurality of closed sipes having a width of not more than 1.5 mm are arranged in a tire axial direction,
each of the closed sipes includes a first end, a second end, a first sipe piece extending in the tire axial direction on the first end side, a second sipe piece extending in the tire axial direction on the second end side, and a third sipe piece inclined with respect to the tire axial direction between the first sipe piece and the second sipe piece, and
the closed sipes are arranged in the tire axial direction overlapping with each other in the tire axial direction and the tire circumferential direction.

Present Disclosure 2

The tire according to Present disclosure 1, wherein the third sipe piece is inclined with respect to the tire axial direction at an angle larger than those of the first sipe piece and the second sipe piece.

Present Disclosure 3

The tire according to Present disclosure 1 or 2, wherein the overlapping length in the tire axial direction of two of the closed sipes is 10% to 40% of the maximum axial length of the closed sipes.

Present Disclosure 4

The tire according to any one of Present disclosures 1 to 3, wherein, an angle between the first sipe piece and the third sipe piece, and an angle between the second sipe piece and the third sipe piece are each not less than 90 degrees.

Present Disclosure 5

The tire according to any one of Present disclosures 1 to 4, wherein the first sipe piece is connected to the third sipe piece on the first side in the tire circumferential direction,
the second sipe piece is connected to the third sipe piece on the second side in the tire circumferential direction,
the first end and the second end are positioned on the second side in the tire circumferential direction than the first sipe piece, and on the first side in the tire circumferential direction than the second sipe piece, and
the closed sipe includes a first outer sipe piece extending from the first end to the first sipe piece, and a second outer sipe piece extending from the second end to the second sipe piece.

Present Disclosure 6

The tire according to Present disclosure 5, wherein an angle between the first sipe piece and the first outer sipe piece, and an angle between the second sipe piece and the second outer sipe piece are each not less than 90 degrees.

Present Disclosure 7

The tire according to Present disclosure 5 or 6, wherein with respect to two of the closed sipes which are adjacent to each other in the tire axial direction, the second sipe piece of the closed sipe on one side overlaps in the tire axial direction with the first sipe piece of the closed sipe on the other side,
the second outer sipe piece of the closed sipe on one side extends from the second sipe piece toward the first side in the tire circumferential direction, and
the first outer sipe piece of the closed sipe on the other side extends from the first sipe piece toward the second side in the tire circumferential direction.

Present Disclosure 8

The tire according to any one of Present disclosures 1 to 7, wherein each of the first sipe piece and the second sipe piece extends at an angle of +/−10 degrees with respect to the tire axial direction.

Present Disclosure 9

The tire according to any one of Present disclosures 1 to 8, wherein the closed sipe includes a bent portion extending in the tire radial direction in a zigzag manner in a sipe cross section.

Present Disclosure 10

The tire according to any one of Present disclosures 1 to 9, wherein the first sipe piece is disposed on the first side in the tire circumferential direction than the second sipe piece,
the first sipe piece and the second sipe piece are each configured as a bent portion extending in the tire radial direction in a zigzag manner in the respective sipe cross section, the bent portion includes an outer inclined portion which continues to an edge of the closed sipe and extends while inclining to one direction with respect to the tire radial direction, the outer inclined portion belonging to the first sipe piece is inclined to the first side in the tire circumferential direction toward an inside in the tire radial direction, and the outer inclined portion belonging to the second sipe piece is inclined to the second side in the tire circumferential direction which is opposite to the first side in the tire circumferential direction, toward an inside in the tire radial direction.

Present Disclosure 11

The tire according to any one of Present disclosures 1 to 10, wherein the first sipe piece is disposed on the first side in the tire circumferential direction than the second sipe piece and on the first side in the axial direction than the second sipe piece, the closed sipe comprises a first outer sipe piece extending from the first end to the first sipe piece toward the first side in the tire circumferential direction, and a second outer sipe piece extending from the second end to the second sipe piece toward the second side in the tire circumferential direction which is opposite to the first side, the first sipe piece and the second sipe piece are each configured as a bent portion extending in the tire radial direction in a zigzag manner in the respective sipe cross section, the bent portion includes an outer inclined portion which continues to an edge of the closed sipe and extends while inclining to one direction with respect to the tire radial direction, the outer inclined portion belonging to the first sipe piece is inclined to the first side in the tire circumferential direction toward an inside in the tire radial direction, and the outer inclined portion belonging to the second sipe piece is inclined to the second side in the tire circumferential direction which is opposite to the first side in the tire circumferential direction, toward an inside in the tire radial direction.

Present Disclosure 12

The tire according to any one of Present disclosures 1 to 9, wherein the first sipe piece is disposed on the first side in the tire circumferential direction than the second sipe piece, and on the first side in the axial direction than the second sipe piece, the closed sipe comprises a first outer sipe piece extending from the first end to the first sipe piece toward the first side in the tire circumferential direction, and a second outer sipe piece extending from the second end to the second sipe piece toward the second side in the tire circumferential direction which is opposite to the first side, the first sipe piece, the second sipe piece, the third sipe piece, the first outer sipe piece and the second outer sipe piece are each configured as a bent portion extending in the tire radial direction in a zigzag manner in the respective sipe cross section, the bent portion includes an outer inclined portion which continues to an edge of the closed sipe and extends while inclining to one direction with respect to the tire radial direction, the outer inclined portion belonging to the first sipe piece and the outer inclined portion belonging to the second sipe piece each incline to the first side in the tire circumferential direction toward an inside in the tire radial direction, the outer inclined portion belonging to the first outer sipe piece and the outer inclined portion belonging to the second outer sipe piece each incline to the first side in the tire axial direction toward an inside in the tire radial direction, and the outer sloped portion belonging to the third sipe piece inclines to the second side in the tire axial direction which is opposite to the first side in the tire axial direction, toward an inside in the tire radial direction.

Present Disclosure 13

The tire according to any one of Present disclosures 9 to 12, wherein the bent portion includes at least two bent elements which are convex toward the same direction.

Present Disclosure 14

The tire according to Present disclosure 13, wherein the two bent elements have the same length in the tire radial direction.

Present Disclosure 15

The tire according to any one of Present disclosures 8 to 14, wherein the closed sipe includes a vertical portion which continues to an inside in the tire radial direction of the bent portion and extends parallel to the tire radial direction.

Present Disclosure 16

The tire according to any one of Present disclosures 1 to 8, wherein the entire closed sipe extends linearly in the tire radial direction in a sipe cross section.

Present Disclosure 17

The tire according to any one of Present disclosures 1 to 16, wherein the closed sipe includes a connecting portion in which sipe walls facing each other are connected to each other and which protrudes outward in the tire radial direction.

Present Disclosure 18

The tire according to Present disclosure 17, wherein the connecting portion is provided in at least one of the first sipe piece and the second sipe piece.

Present Disclosure 19

The tire according to Present disclosure 17 or 18, wherein the connecting portion is provided in each of the first sipe piece and the second sipe piece.

Present Disclosure 20

The tire according to any one of Present disclosures 17 to 19, wherein the width of the connecting portion along the length direction of the closed sipe is 10% to 50% of the length of the first sipe piece.

Present Disclosure 21

The tire according to any one of Present disclosures 17 to 20, wherein the height in the tire radial direction of the connecting portion is 10% to 90% of the maximum depth of the closed sipe.

Present Disclosure 22

The tire according to any one of the present disclosure 17 to 21, wherein the connecting portion is provided in each of the first sipe piece and the second sipe piece, and
the height in the tire radial direction of the connecting portion provided in the first sipe piece is the same as the height in the tire radial direction of the connecting portion provided in the second sipe piece.

Present Disclosure 23

The tire according to any one of Present disclosures 1 to 22, wherein the tread portion includes a shoulder land portion positioned on the outermost side in the tire axial direction,
the shoulder land portion comprises a plurality of shoulder blocks divided by a plurality of lateral grooves extending in a tire axial direction, and
the shoulder block is provided with a plurality of the closed sipes.

The invention claimed is:

1. A tire comprising
a tread portion including a land portion,
the land portion provided with a plurality of closed sipes each having a width of not more than 1.5 mm and arranged in a tire axial direction,
each of the closed sipes comprising a first end, a second end, a first sipe piece, a second sipe piece, a third sipe piece, a first outer sipe piece, and a second outer sipe piece,
the first sipe piece extending in the tire axial direction on a first end side of the third sipe piece,
the second sipe piece extending in the tire axial direction on a second end side of the third sipe piece,
the first sipe piece disposed on a first side in a tire circumferential direction of the second sipe piece,
the third sipe piece inclined with respect to the tire axial direction at an angle larger than those of the first sipe piece and the second sipe piece while extending therebetween,
the first outer sipe piece extending toward the first side from the first end to the first sipe piece, and
the second outer sipe piece extending toward a second side in the tire circumferential direction opposite to the first side from the second end to the second sipe piece,
wherein, in the plurality of closed sipes, every two of the closed sipes which are arranged in the tire axial direction overlap with each other in the tire axial direction and the tire circumferential direction, and in each of the closed sipes, each sipe piece of the first sipe piece, the second sipe piece, the first outer sipe piece and the second outer sipe piece extends in a depth direction of the closed sipe in a zigzag shape in a cross section perpendicular to a length direction of the closed sipe, from a radially outer end to a radially inner end of the closed sipe, and
the third sipe piece extends in the depth direction in a flat shape in a cross section perpendicular to the length direction of the closed sipe, from the radially outer end to the radially inner end of the closed sipe.

2. The tire according to claim 1, wherein an overlapping length in the tire axial direction of the two of the closed sipes is 10% to 40% of the maximum axial length of the closed sipes.

3. The tire according to claim 1, wherein an angle between the first sipe piece and the third sipe piece, and an angle between the second sipe piece and the third sipe piece are each not less than 90 degrees.

4. The tire according to claim 1, wherein each of the first sipe piece and the second sipe piece extends at an angle in a range from +10 degrees to −10 degrees with respect to the tire axial direction.

5. The tire according to claim 1, wherein the tread portion includes, as the land portion, a shoulder land portion positioned on the outermost side in the tire axial direction,
the shoulder land portion comprises a plurality of shoulder blocks divided by a plurality of lateral grooves extending in a tire axial direction, and
each shoulder block is provided with a plurality of groups arranged in the tire circumferential direction, with the plurality of the closed sipes as a group.

6. The tire according to claim 1, wherein the each sipe piece extending in the depth direction in the zigzag shape has a structure in which flat quadrilateral shapes alternately inclined in opposite directions with respect to a tire radial direction are arranged in the depth direction.

7. A tire comprising
a tread portion including a land portion,
the land portion provided with a plurality of closed sipes each having a width of not more than 1.5 mm and arranged in a tire axial direction,
each of the closed sipes comprising a first end, a second end, a first sipe piece, a second sipe piece, a third sipe piece, a first outer sipe piece and a second outer sipe piece,
the first sipe piece extending in the tire axial direction on a first end side of the third sipe piece,
the second sipe piece extending in the tire axial direction on a second end side of the third sipe piece,
the first sipe piece disposed on a first side in a tire circumferential direction of the second sipe piece,
the third sipe piece inclined with respect to the tire axial direction at an angle larger than those of the first sipe piece and the second sipe piece while extending therebetween,
the first outer sipe piece extending toward the first side from the first end to the first sipe piece, and
the second outer sipe piece extending toward a second side in the tire circumferential direction opposite to the first side from the second end to the second sipe piece,
wherein, in the plurality of closed sipes, every two of the closed sipes which are arranged in the tire axial direction overlap with each other in the tire axial direction and the tire circumferential direction, and in each of the closed sipes, each sipe piece of the first sipe piece, the second sipe piece, the third sipe piece, the first outer sipe piece and the second outer sipe piece extends in a depth direction of the closed sipe in a zigzag shape in a cross section perpendicular to a length direction of the closed sipe, from a radially outer end to a radially inner end of the closed sipe.

8. The tire according to claim 7, wherein
the first sipe piece and the second sipe piece are each provided with a connecting portion which protrudes radially outwardly from a bottom of the closed sipe so that sipe walls facing each other are connected, and
the third sipe piece, the first outer sipe piece and the second outer sipe piece are not provided with the connecting portion.

9. The tire according to claim 8, wherein the each sipe piece extending in the depth direction in the zigzag shape has a structure in which flat quadrilateral shapes alternately inclined in opposite directions with respect to a tire radial direction are arranged in the depth direction.

10. The tire according to claim 7, wherein
the first sipe piece, the second sipe piece and the third sipe piece are each provided with a connecting portion which protrudes radially outwardly from a bottom of the closed sipe so that sipe walls facing each other are connected, and
the first outer sipe piece and the second outer sipe piece are not provided with the connecting portion.

11. The tire according to claim 10, wherein the each sipe piece extending in the depth direction in the zigzag shape has a structure in which flat quadrilateral shapes alternately inclined in opposite directions with respect to a tire radial direction are arranged in the depth direction.

12. The tire according to claim 7, wherein
the tread portion includes, as the land portion, a shoulder land portion positioned on the outermost side in the tire axial direction,
the shoulder land portion comprises a plurality of shoulder blocks divided by a plurality of lateral grooves extending in a tire axial direction, and
each shoulder block is provided with a plurality of groups arranged in the tire circumferential direction, with the plurality of the closed sipes as a group.

13. The tire according to claim 7, wherein the each sipe piece extending in the depth direction in the zigzag shape has a structure in which flat quadrilateral shapes alternately inclined in opposite directions with respect to a tire radial direction are arranged in the depth direction.

\* \* \* \* \*